(12) United States Patent  (10) Patent No.: US 9,138,029 B2
Dojan et al.  (45) Date of Patent: Sep. 22, 2015

(54) ARTICLE OF FOOTWEAR HAVING AN UPPER INCORPORATING A TENSILE STRAND WITH A COVER LAYER

(71) Applicant: Nike, Inc., Beaverton, OR (US)

(72) Inventors: Frederick J. Dojan, Vancouver, WA (US); Chin-Chen Huang, Taichung (TW); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 372 days.

(21) Appl. No.: 13/766,071

(22) Filed: Feb. 13, 2013

(65) Prior Publication Data

US 2013/0212811 A1  Aug. 22, 2013

Related U.S. Application Data

(60) Division of application No. 12/546,019, filed on Aug. 24, 2009, now Pat. No. 8,418,380, which is a continuation-in-part of application No. 11/441,924, filed on May 25, 2006, now Pat. No. 7,870,681.

(51) Int. Cl.
*A43B 23/02* (2006.01)
*B29C 65/02* (2006.01)
(Continued)

(52) U.S. Cl.
CPC ............ *A43B 23/0245* (2013.01); *A43B 1/0072* (2013.01); *A43B 3/26* (2013.01); *A43B 5/06* (2013.01); *A43B 23/025* (2013.01);
(Continued)

(58) Field of Classification Search
CPC ............. A43B 23/0235; A43B 23/024; A43B 23/0255; A43B 23/026

USPC ............ 156/308.2, 309.6, 176, 179, 297, 70; 12/146 C, 146 CK; 36/47–49
See application file for complete search history.

(56) References Cited

U.S. PATENT DOCUMENTS 2,034,091 A  3/1936  Dunbar
2,048,294 A  7/1936  Roberts
(Continued)

FOREIGN PATENT DOCUMENTS

CN  101125044 A  2/2008
CN  ZL200610139157.8  9/2010
(Continued)

OTHER PUBLICATIONS

European Office Action dated Feb. 3, 2015 in European Patent Application No. 10766378.3.
(Continued)

*Primary Examiner* — Scott W Dodds
(74) *Attorney, Agent, or Firm* — Plumsea Law Group, LLC

(57) ABSTRACT

An article of footwear may have a sole structure and an upper that includes a foundation element, a strand, and a cover layer. The strand is positioned adjacent to an exterior surface of the foundation element and substantially parallel to the exterior surface for a distance of at least five centimeters. The cover layer extends along the strand for the distance of at least five centimeters, and the strand is positioned between the cover layer and the foundation element. In some configurations, the cover layer has a pair of edges on opposite sides of the strand, the strand is substantially centered between the edges of the cover layer for the distance of at least five centimeters, and areas of the exterior surface are exposed beyond the edges of the cover layer.

20 Claims, 23 Drawing Sheets

(51) Int. Cl.
- *A43B 1/00* (2006.01)
- *A43B 3/26* (2006.01)
- *A43B 5/06* (2006.01)
- *A43D 8/00* (2006.01)
- *A43D 111/00* (2006.01)

(52) U.S. Cl.
CPC ........... *A43B23/026* (2013.01); *A43B 23/0225* (2013.01); *A43B 23/0255* (2013.01); *A43B 23/0265* (2013.01); *A43D 8/00* (2013.01); *A43D 111/00* (2013.01); *B29C 65/02* (2013.01)

(56) References Cited

U.S. PATENT DOCUMENTS

| | | | |
|---|---|---|---|
| 2,205,356 A | 6/1940 | Gruensfelder | |
| 2,311,996 A | 2/1943 | Parker | |
| 2,622,052 A | 12/1952 | Chandler | |
| 3,439,434 A | 4/1969 | Tangorra | |
| 3,672,078 A | 6/1972 | Fukuoka | |
| 3,823,493 A | 7/1974 | Brehm et al. | |
| 4,120,101 A * | 10/1978 | Drew | 36/4 |
| 4,592,154 A | 6/1986 | Oatman | |
| 4,627,369 A | 12/1986 | Conrad et al. | |
| 4,634,616 A | 1/1987 | Musante | |
| 4,642,819 A | 2/1987 | Ales et al. | |
| 4,756,098 A | 7/1988 | Boggia | |
| 4,858,339 A | 8/1989 | Hayafuchi et al. | |
| 4,873,725 A | 10/1989 | Mitchell | |
| 5,149,388 A | 9/1992 | Stahl | |
| 5,156,022 A | 10/1992 | Altman | |
| 5,271,130 A | 12/1993 | Batra | |
| 5,278,356 A * | 1/1994 | Miller | 174/117 A |
| 5,285,658 A | 2/1994 | Altman et al. | |
| 5,291,671 A | 3/1994 | Caberlotto et al. | |
| 5,345,638 A | 9/1994 | Nishida | |
| 5,359,790 A | 11/1994 | Iverson et al. | |
| 5,367,795 A | 11/1994 | Iverson et al. | |
| 5,371,957 A | 12/1994 | Gaudio | |
| 5,380,480 A | 1/1995 | Okine et al. | |
| 5,399,410 A | 3/1995 | Urase | |
| 5,645,935 A | 7/1997 | Kemper et al. | |
| 5,813,148 A | 9/1998 | Guerra | |
| 5,832,540 A | 11/1998 | Knight | |
| D405,587 S | 2/1999 | Merikoski | |
| 5,930,918 A | 8/1999 | Healy | |
| 5,990,378 A | 11/1999 | Ellis | |
| 6,003,247 A | 12/1999 | Steffe | |
| 6,004,891 A | 12/1999 | Tuppin et al. | |
| 6,009,637 A | 1/2000 | Pavone | |
| 6,029,376 A | 2/2000 | Cass | |
| 6,038,702 A | 3/2000 | Knerr | |
| 6,052,921 A | 4/2000 | Oreck | |
| 6,128,835 A | 10/2000 | Ritter | |
| 6,151,804 A | 11/2000 | Hieblinger | |
| 6,164,228 A | 12/2000 | Lin | |
| 6,170,175 B1 | 1/2001 | Funk | |
| 6,213,634 B1 | 4/2001 | Harrington et al. | |
| 6,467,193 B1 | 10/2002 | Okajima | |
| 6,505,424 B2 | 1/2003 | Oorei et al. | |
| 6,615,427 B1 | 9/2003 | Hailey | |
| 6,665,958 B2 | 12/2003 | Goodwin | |
| 6,718,895 B1 | 4/2004 | Fortuna | |
| 6,860,214 B1 | 3/2005 | Wang | |
| 6,910,288 B2 | 6/2005 | Dua | |
| 7,086,179 B2 | 8/2006 | Dojan | |
| 7,086,180 B2 | 8/2006 | Dojan | |
| 7,100,310 B2 | 9/2006 | Foxen | |
| 7,293,371 B2 | 11/2007 | Aveni | |
| 7,337,560 B2 | 3/2008 | Marvin et al. | |
| 7,546,698 B2 | 6/2009 | Meschter | |
| 7,574,818 B2 | 8/2009 | Meschter | |
| 7,665,230 B2 | 2/2010 | Dojan | |
| 7,676,956 B2 | 3/2010 | Dojan | |
| 7,770,307 B2 | 8/2010 | Meschter | |
| 7,814,852 B2 | 10/2010 | Meschter | |
| 7,849,518 B2 | 12/2010 | Moore et al. | |
| 7,870,681 B2 | 1/2011 | Meschter | |
| 7,870,682 B2 | 1/2011 | Meschter et al. | |
| 8,122,616 B2 | 2/2012 | Meschter et al. | |
| 8,132,340 B2 | 3/2012 | Meschter | |
| 8,266,827 B2 | 9/2012 | Dojan et al. | |
| 8,312,645 B2 | 11/2012 | Dojan et al. | |
| 8,312,646 B2 | 11/2012 | Meschter et al. | |
| 8,388,791 B2 | 3/2013 | Dojan et al. | |
| 8,418,380 B2 | 4/2013 | Dojan et al. | |
| 2001/0051484 A1 | 12/2001 | Ishida et al. | |
| 2003/0138586 A1 * | 7/2003 | Fowler | 428/57 |
| 2003/0178738 A1 | 9/2003 | Staub et al. | |
| 2004/0074589 A1 | 4/2004 | Gessler et al. | |
| 2004/0118018 A1 | 6/2004 | Dua | |
| 2004/0142631 A1 | 7/2004 | Luk | |
| 2004/0181972 A1 | 9/2004 | Csorba | |
| 2004/0261295 A1 | 12/2004 | Meschter | |
| 2005/0028403 A1 | 2/2005 | Swigart | |
| 2005/0095406 A1 * | 5/2005 | Gunzel et al. | 428/190 |
| 2005/0115284 A1 | 6/2005 | Dua | |
| 2005/0132609 A1 | 6/2005 | Dojan | |
| 2005/0268497 A1 | 12/2005 | Alfaro | |
| 2006/0048413 A1 | 3/2006 | Sokolowski et al. | |
| 2006/0137221 A1 | 6/2006 | Dojan | |
| 2007/0199210 A1 | 8/2007 | Vattes et al. | |
| 2007/0271821 A1 | 11/2007 | Meschter | |
| 2008/0016717 A1 | 1/2008 | Ruban | |
| 2008/0110049 A1 | 5/2008 | Sokolowski et al. | |
| 2010/0018075 A1 | 1/2010 | Meschter et al. | |
| 2010/0037483 A1 | 2/2010 | Meschter et al. | |
| 2010/0043253 A1 | 2/2010 | Dojan | |
| 2010/0154256 A1 | 6/2010 | Dua | |
| 2010/0175276 A1 | 7/2010 | Dojan et al. | |
| 2010/0251491 A1 | 10/2010 | Dojan et al. | |
| 2010/0251564 A1 | 10/2010 | Meschter | |
| 2011/0041359 A1 | 2/2011 | Dojan et al. | |

FOREIGN PATENT DOCUMENTS

| | | |
|---|---|---|
| CN | ZL200710105234.2 | 9/2010 |
| CN | ZL200710105235.7 | 10/2011 |
| DE | 20215559 | 1/2003 |
| EP | 0082824 | 6/1983 |
| EP | 0818289 | 1/1998 |
| EP | 2019602 | 6/2011 |
| FR | 1462349 | 2/1967 |
| FR | 2046671 | 3/1971 |
| FR | 2457651 | 12/1980 |
| WO | 98/43506 | 10/1998 |
| WO | 03/013301 | 2/2003 |
| WO | WO2004089609 | 10/2004 |
| WO | WO2007139567 | 12/2007 |
| WO | WO2007140055 | 12/2007 |
| WO | WO2011011176 | 1/2011 |
| WO | WO2011028441 | 3/2011 |
| WO | WO2011028443 | 3/2011 |

OTHER PUBLICATIONS

International Search Report and Written Opinion for PCT/US2010/046133, mailed Dec. 27, 2010.
International Search Report and Written Opinion for PCT/US2010/040607, mailed Jan. 24, 2011.
International Search Report and Written Opinion for PCT/US2010/046115, mailed Dec. 27, 2010.
International Search Report and Written Opinion for PCT/US2007/066696, mailed Sep. 7, 2007.

* cited by examiner

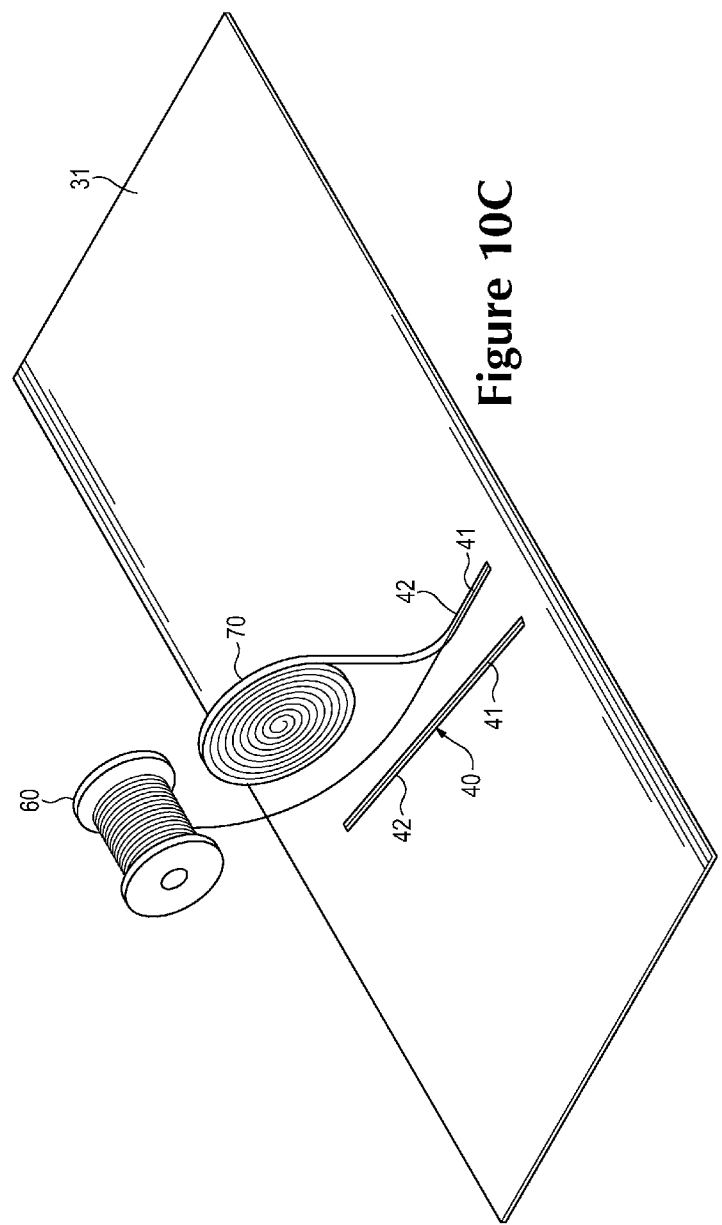

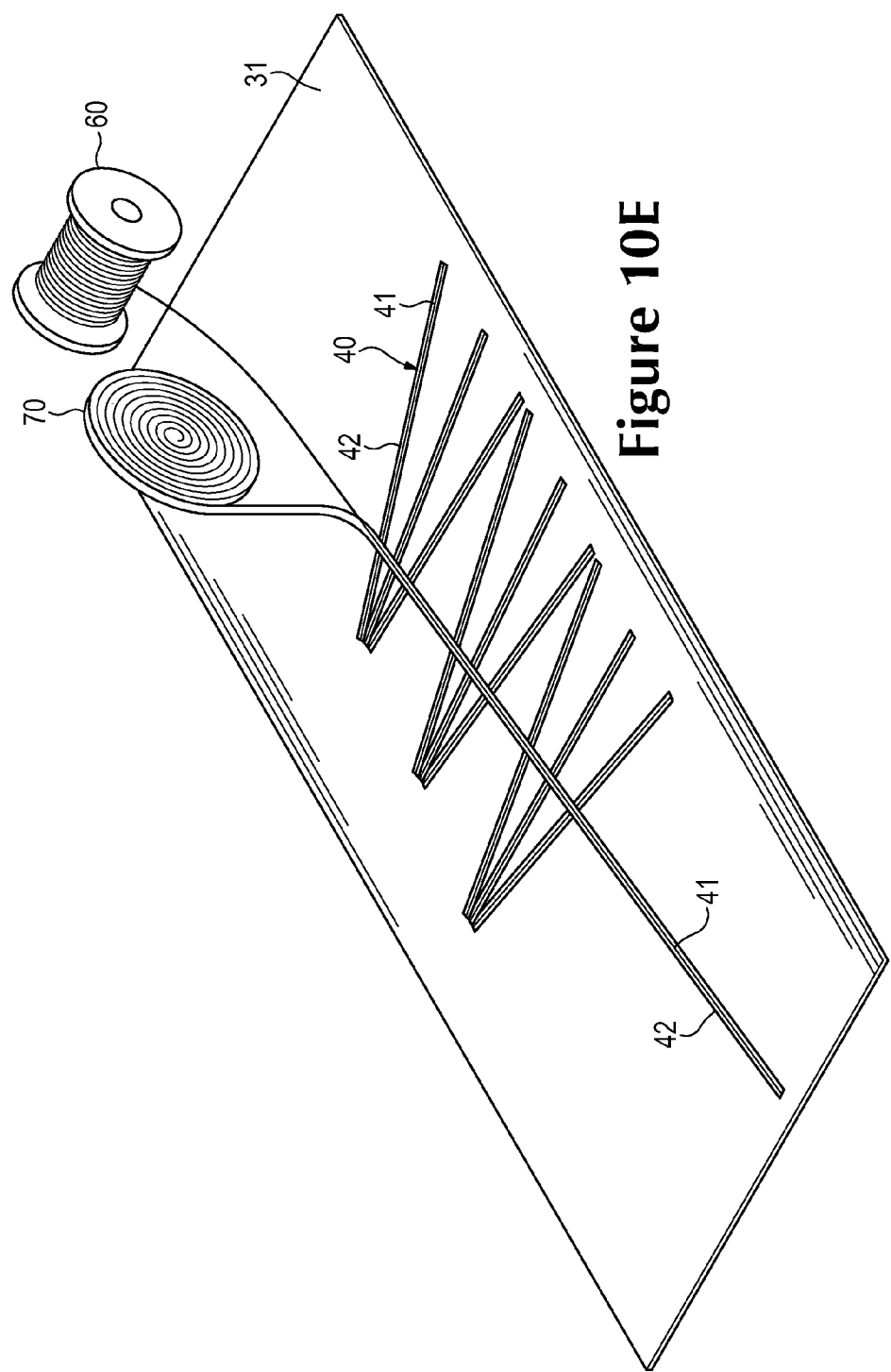

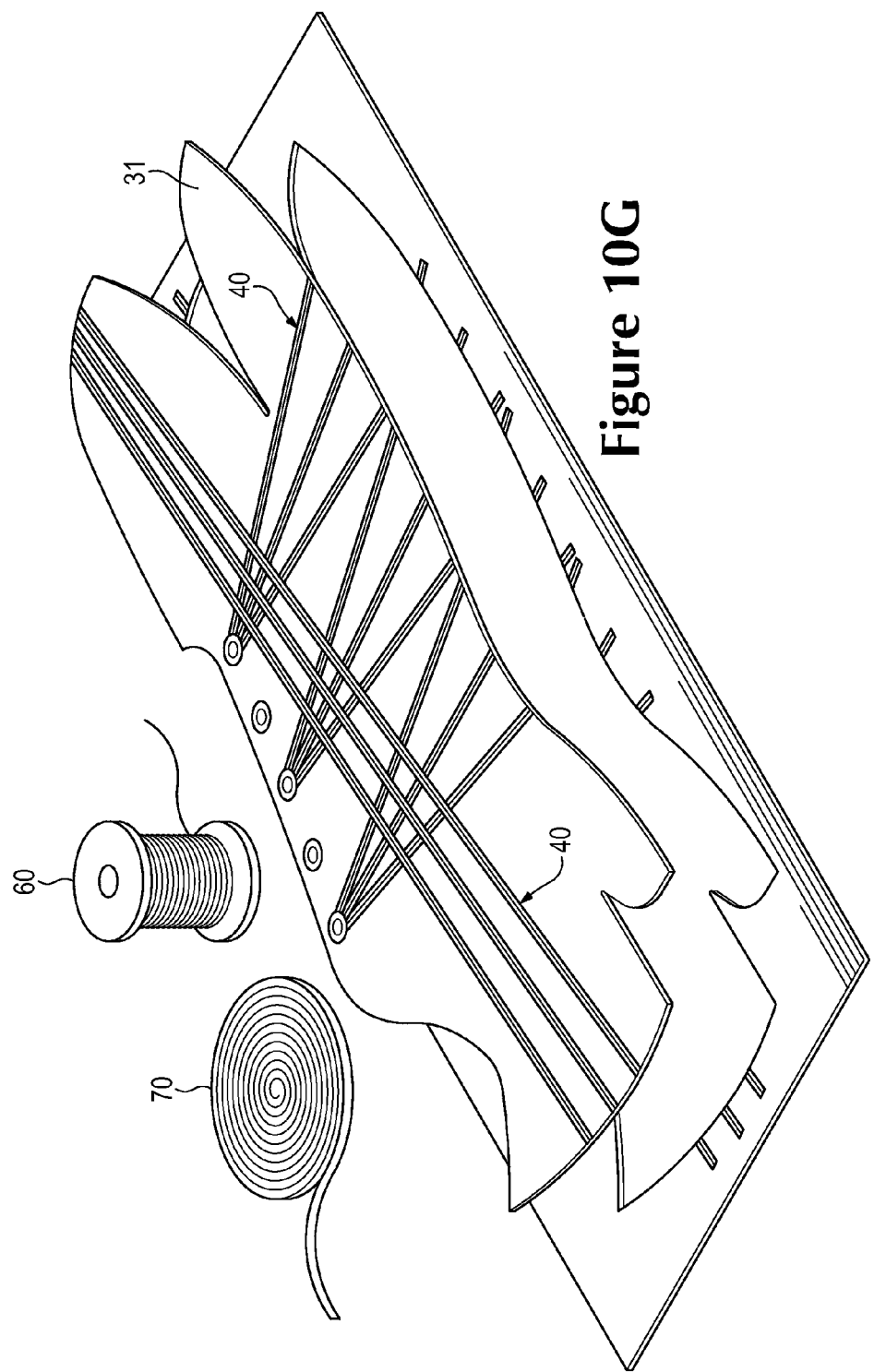

ARTICLE OF FOOTWEAR HAVING AN UPPER INCORPORATING A TENSILE STRAND WITH A COVER LAYER

CROSS-REFERENCE TO RELATED APPLICATIONS

This U.S. patent application is a division of U.S. patent application Ser. No. 12/546,019, which was filed in the U.S. Patent and Trademark Office on 24 Aug. 2009 and entitled "Article Of Footwear Having An Upper Incorporating A Tensile Strand With A Cover Layer", which application is a continuation-in-part application and claims priority under 35 U.S.C. §120 to U.S. patent application Ser. No. 11/441,924, which was filed in the U.S. Patent and Trademark Office on 25 May 2006 and entitled "Article Of Footwear Having An Upper With Thread Structural Elements", and which issued as U.S. Pat. No. 7,870,681 on 18 Jan. 2011, such prior U.S. patent applications being entirely incorporated herein by reference.

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart specific properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

An article of footwear is disclosed below as having an upper and a sole structure secured to the upper. The upper includes a foundation element, a strand, and a cover layer. The foundation element has an interior surface and an opposite exterior surface. The strand is positioned adjacent to the exterior surface and substantially parallel to the exterior surface for a distance of at least five centimeters. The cover layer extends along the strand for the distance of at least five centimeters, and the strand is positioned between the cover layer and the foundation element.

A method of manufacturing an article of footwear is also disclosed. The method includes simultaneously laying a strand and a cover layer against an exterior surface of an upper of the article of footwear. Additionally, the cover layer is bonded to the exterior surface.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 10A-10G are schematic perspective views of a process for manufacturing the upper.

DETAILED DESCRIPTION

The following discussion and accompanying figures disclose various configurations of an article of footwear incorporating tensile strands. The article of footwear is disclosed as having a general configuration suitable for walking or running. Concepts associated with the article of footwear may also be applied to a variety of other footwear types, including baseball shoes, basketball shoes, cross-training shoes, cycling shoes, football shoes, tennis shoes, soccer shoes, and hiking boots, for example. The concepts may also be applied to footwear types that are generally considered to be non-athletic, including dress shoes, loafers, sandals, and work boots. The various concepts disclosed herein apply, therefore, to a wide variety of footwear types. In addition to footwear, the tensile strands or concepts associated with the tensile strands may be incorporated into a variety of other products.

General Footwear Structure

Figure 1:
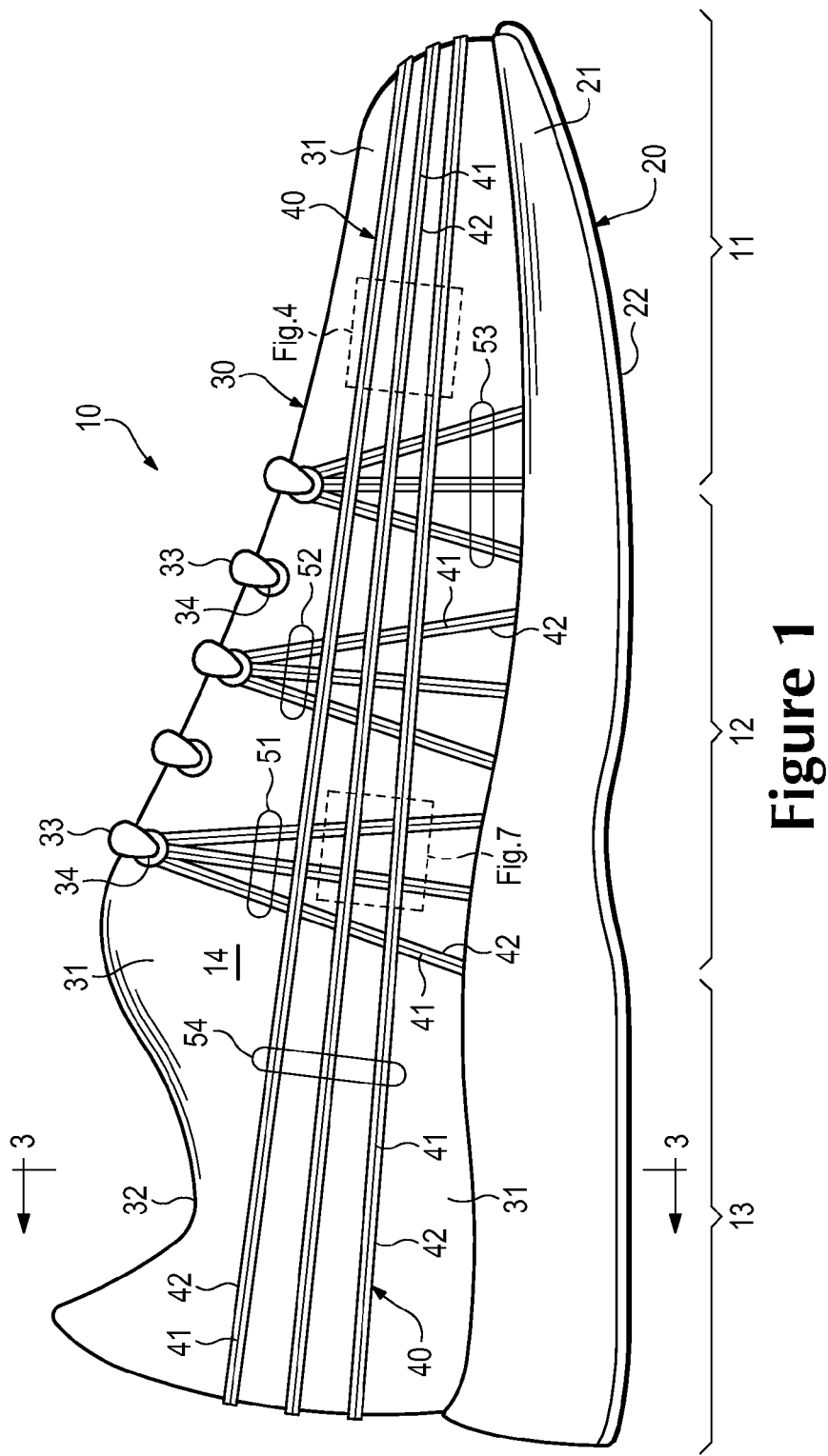
FIG. 1 is a lateral side elevational view of an article of footwear.
Figure 2:
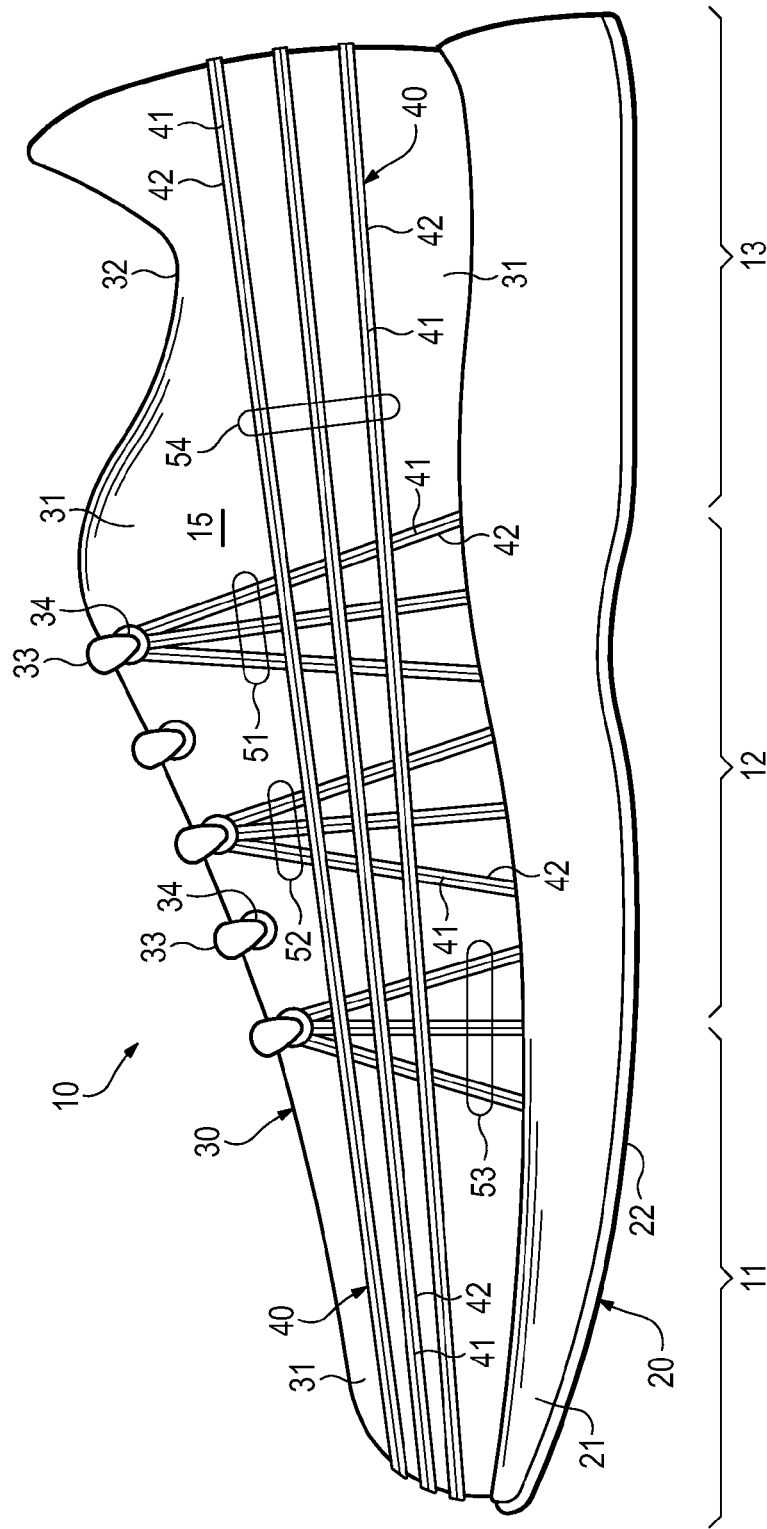
FIG. 2 is a medial side elevational view of the article of footwear.
Figure 3:
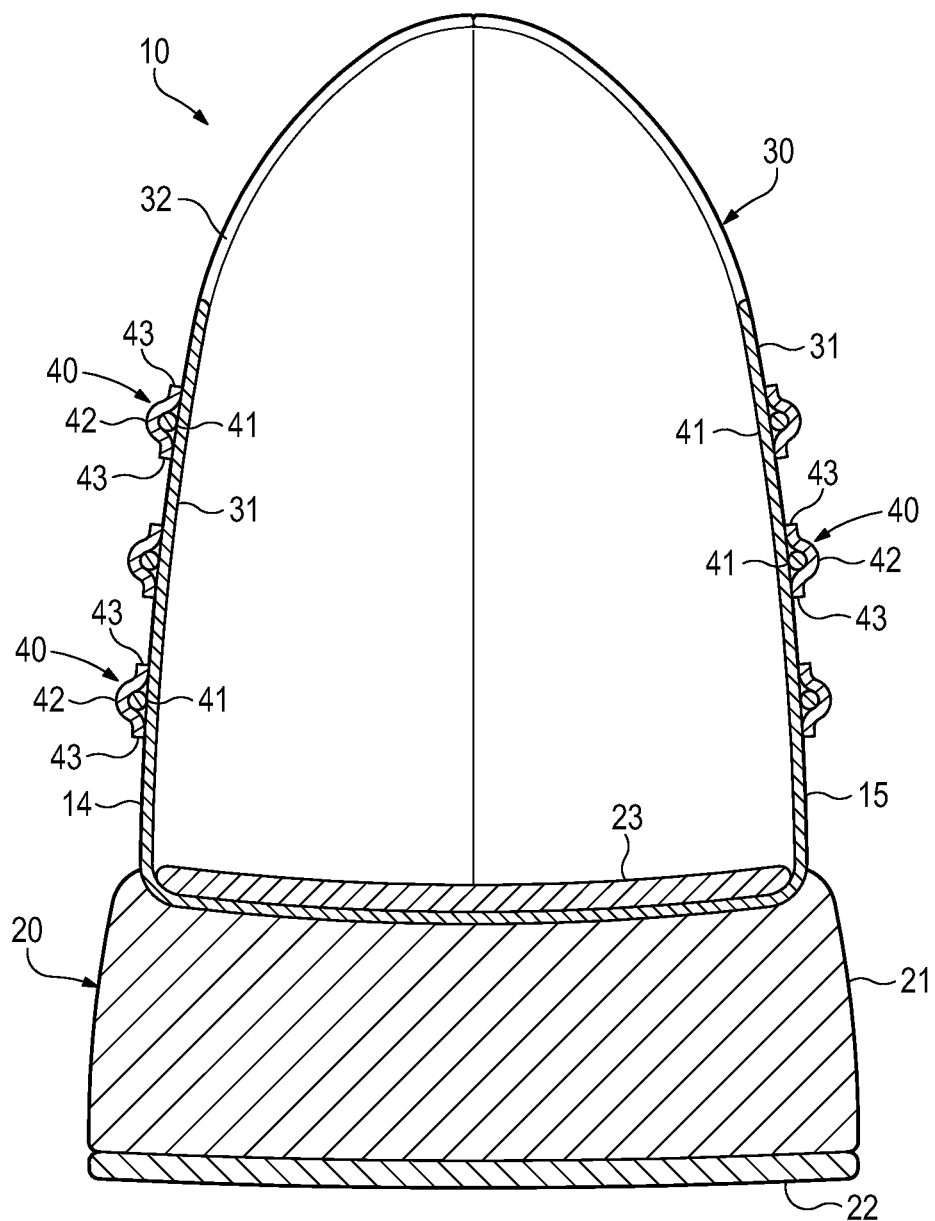
FIG. 3 is a cross-sectional view of the article of footwear, as defined by section line 3-3 in FIG. 1.
Figure 4:
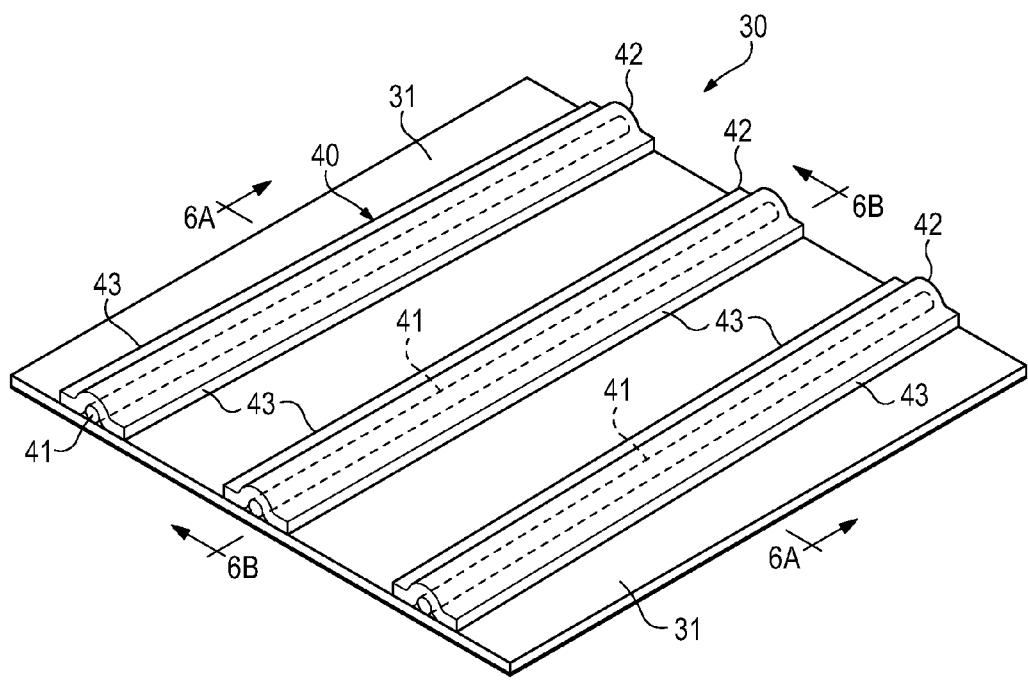
FIG. 4 is a perspective view of a first portion of an upper of the article of footwear, as defined in FIG. 1.
Figure 5:
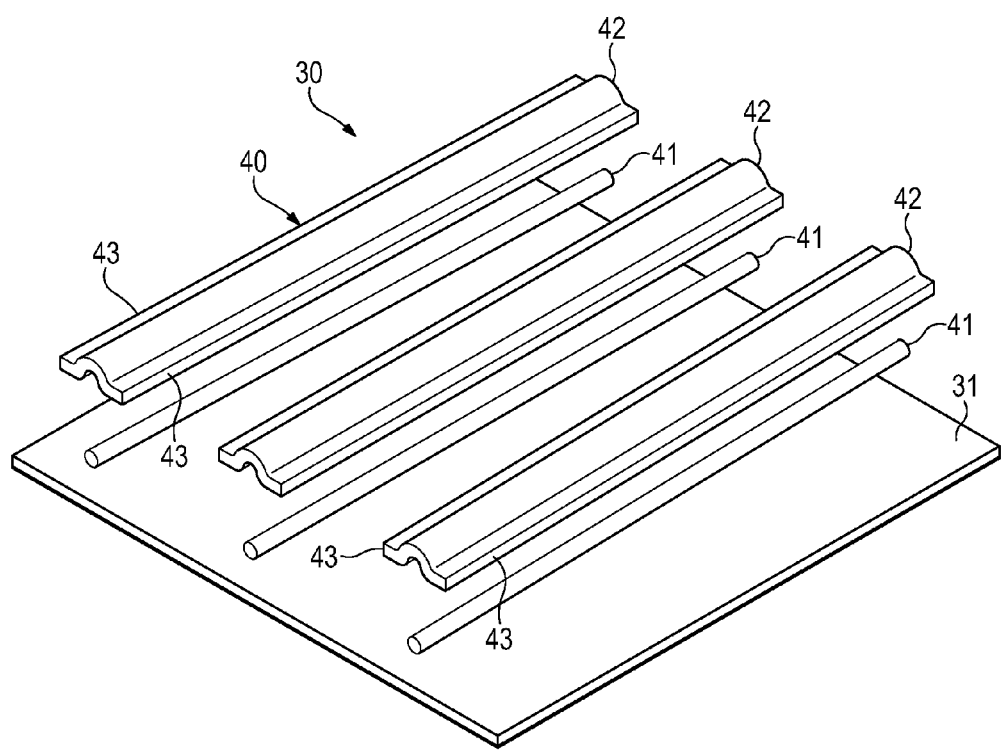
FIG. 5 is an exploded perspective view of the first portion of the upper.

An article of footwear 10 is depicted in FIGS. 1-3 as including a sole structure 20 and an upper 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to sole structure 20, upper 30, and individual elements thereof.

Sole structure 20 is secured to upper 30 and extends between the foot and the ground when footwear 10 is worn. The primary elements of sole structure 20 are a midsole 21, an outsole 22, and a sockliner 23. Midsole 21 is secured to a lower surface of upper 30 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In additional configurations, midsole 21 may incorporate fluid-filled chambers, plates, moderators, or other elements that further attenuate forces, enhance stability, or influence motions of the foot, or midsole 21 may be primarily formed from a fluid-filled chamber. Outsole 22 is secured to a lower surface of midsole 21 and may be formed from a wear-resistant rubber material that is textured to impart traction. Sockliner 23 is located within upper 30 and is positioned to extend under a lower surface of the foot. Although this configuration for sole structure 20 provides an example of a sole structure that may be used in connection with upper 30, a variety of other conventional or nonconventional configurations for sole structure 20 may also be utilized. Accordingly, the configuration and features of sole structure 20 or any sole structure utilized with upper 30 may vary considerably.

Upper 30 is secured to sole structure 20 and includes a foundation element 31 that defines a void within footwear 10 for receiving and securing a foot relative to sole structure 20. More particularly, an interior surface of foundation element 31 forms at least a portion of the void within upper 30. As depicted, foundation element 31 is shaped to accommodate the foot and extends along the lateral side of the foot, along the medial side of the foot, over the foot, around the heel, and under the foot. In other configurations, foundation element 31 may only extend over or along a portion of the foot, thereby forming only a portion of the void within upper 30. Access to the void within foundation element 31 is provided by an ankle opening 32 located in at least heel region 13. A lace 33 extends through various lace apertures 34, which extend through foundation element 31, and permit the wearer to modify dimensions of upper 30 to accommodate the proportions of the foot. More particularly, lace 33 permits the wearer to tighten upper 30 around the foot, and lace 33 permits the wearer to loosen upper 30 to facilitate entry and removal of the foot from the void (i.e., through ankle opening 32). In addition, foundation element 31 may include a tongue (not depicted) that extends under lace 33.

The various portions of foundation element 31 may be formed from one or more of a plurality of material elements (e.g., textiles, polymer sheets, foam layers, leather, synthetic leather) that are stitched or bonded together to form the void within footwear 10. Referring to FIG. 3, foundation element 31 is depicted as being formed from a single material layer, but may also be formed from multiple material layers that each impart different properties. As noted above, foundation element 31 extends along the lateral side of the foot, along the medial side of the foot, over the foot, around the heel, and under the foot. Moreover, an interior surface of foundation element 31 contacts the foot (or a sock worn over the foot), whereas an exterior surface of foundation element 31 forms at least a portion of an exterior surface of upper 30. Although the material elements forming foundation element 31 may impart a variety of properties to upper 30, a tensile element 40 is secured to each of lateral side 14 and medial side 15 and, more particularly, is secured to the exterior surface of foundation element 31. A majority of the exterior surface of upper 30 is formed, therefore, by the combination of foundation element 31 and tensile element 40.

Tensile element 40 incorporates various strands 41. Referring to FIGS. 1 and 2, strands 41 extend in a generally (a) vertical direction between lace apertures 34 and sole structure 20 and (b) horizontal direction between forefoot region 11 and heel region 13 on both of lateral side 14 and medial side 15. Referring also to FIG. 3, each of the various strands 41 are located between foundation element 31 and one of a plurality of cover layers 42. Although tensile element 40 is located on both of sides 14 and 15, tensile element 40 may be limited to one of sides 14 and 15 in some configurations of footwear 10. Tensile element 40 may, for example, only extend through a portion of lateral side 14 (e.g., limited to midfoot region 12) or may be expanded to form a majority of lateral side 14 and medial side 15. That is, a single element having the general configuration of tensile element 40 and including strands 41 and cover layers 42 may extend through both lateral side 14 and medial side 15. In other configurations, additional elements may be joined to tensile element 40.

During walking, running, or other ambulatory activities, a foot within the void in footwear 10 may tend to stretch upper 30. That is, many of the material elements forming upper 30, including foundation element 31, may stretch when placed in tension by movements of the foot. Although strands 41 may also stretch, strands 41 generally stretch to a lesser degree than the other material elements forming upper 30 (e.g., foundation element 31 and cover layers 42). Each of strands 41 may be located, therefore, to form structural components in upper 30 that resist stretching in specific directions or reinforce locations where forces are concentrated. As an example, the various strands 41 that extend between lace apertures 34 and sole structure 20 resist stretch in the medial-lateral direction (i.e., in a direction extending around upper 30). These strands 41 are also positioned adjacent to and radiate outward from lace apertures 34 to resist stretch due to tension in lace 33. As another example, the various strands 41 that extend between forefoot region 11 and heel region 13 resist stretch in a longitudinal direction (i.e., in a direction extending through each of regions 11-13). Accordingly, strands 41 are located to form structural components in upper 30 that resist stretch.

Tensile Element Configuration

A first portion of upper 30 including tensile element 40 is depicted in FIGS. 4-6B. As discussed above, tensile element 40 includes strands 41 and cover layers 42, with strands 41 being positioned between cover layers 42 and an exterior surface of foundation element 31. In this configuration, strands 41 lie adjacent to the exterior surface of foundation element 31 and substantially parallel to the exterior surface of foundation element 31. Strands 41 also lie adjacent to inner surfaces of cover layers 42 and substantially parallel to the surfaces of cover layers 42. As discussed above, strands 41 form structural components in upper 30 that resist stretch. By being substantially parallel to the surfaces or planes of foundation element 31 and cover layers 42, strands 41 resist stretch in directions that correspond with the planes of upper 30. Although strands 41 may extend through foundation element 31 (e.g., as a result of stitching) in some locations, areas where strands 41 extend through foundation element 31 may permit stretch, thereby reducing the overall ability of strands 41 to limit stretch. As a result, each of strands 41 generally lie adjacent to the exterior surface of foundation element 31 and substantially parallel to the exterior surface of foundation element 31 for distances of at least twelve millimeters, and may lie adjacent to the exterior surface of foundation element 31 and substantially parallel to the exterior surface of foundation element 31 throughout distances of at least five centimeters or more.

Figure 6A:
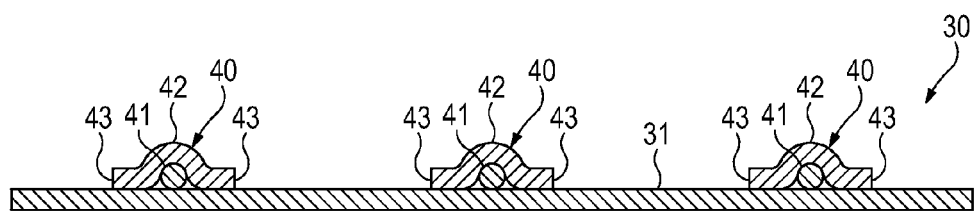
FIGS. 6A and 6B are cross-sectional views of the first portion of the upper, as defined by section lines 6A and 6B in FIG. 4.
Figure 6B:
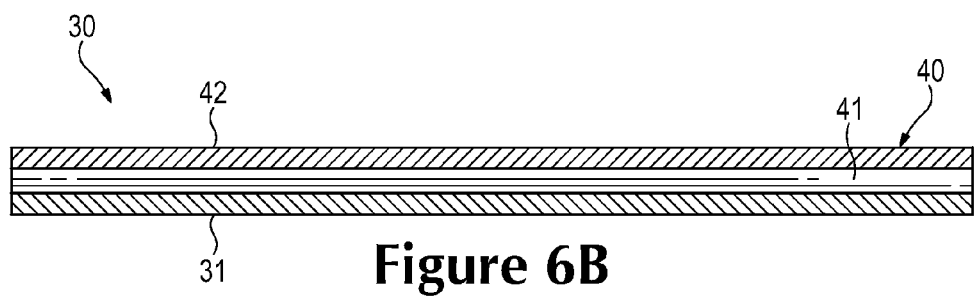
Figure 7:
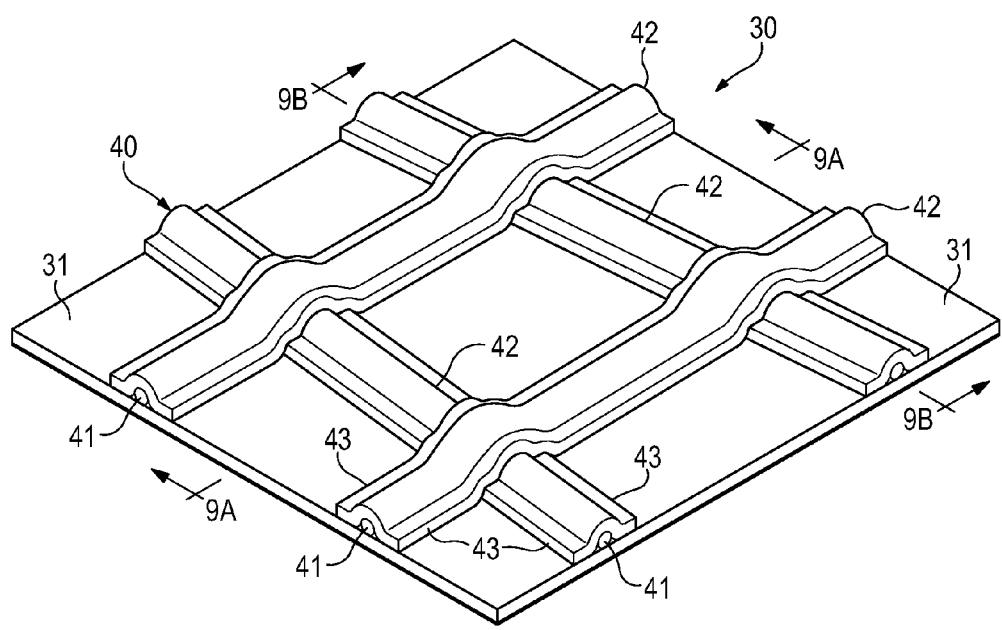
FIG. 7 is a perspective view of a second portion of an upper of the article of footwear, as defined in FIG. 1.
Figure 8:
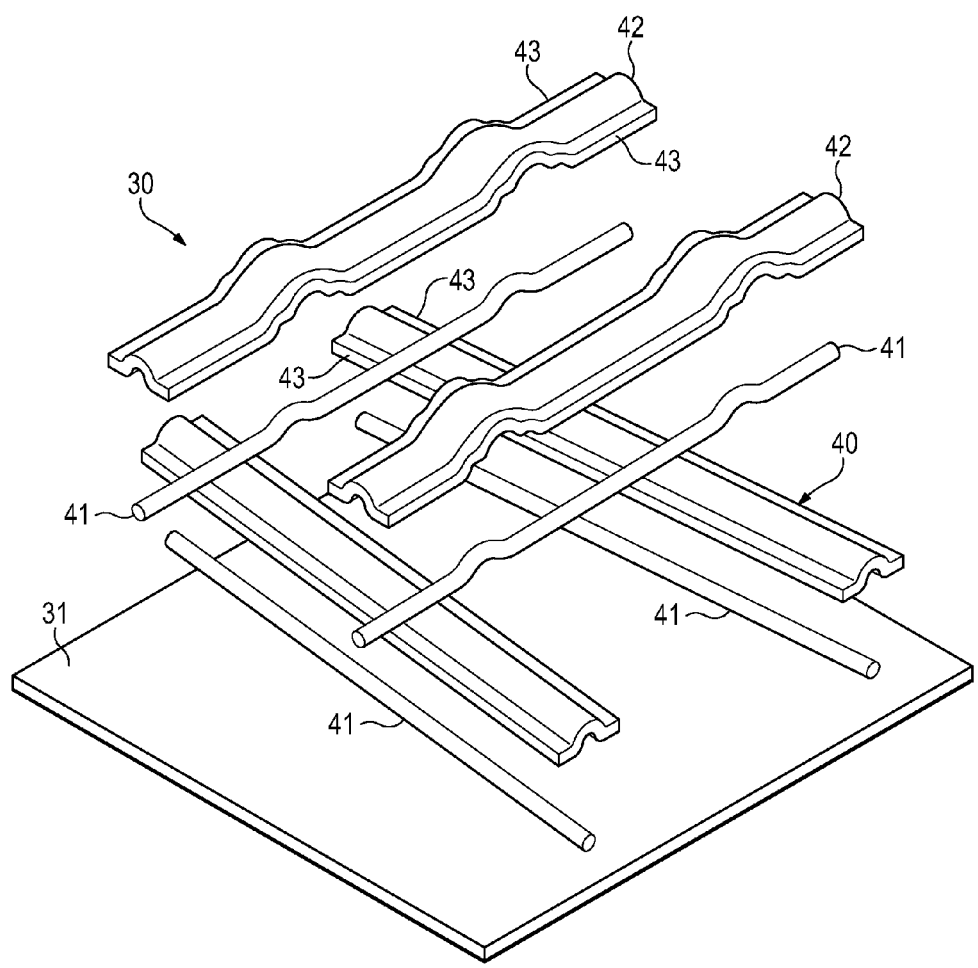
FIG. 8 is an exploded perspective view of the second portion of the upper.
Figure 9A:
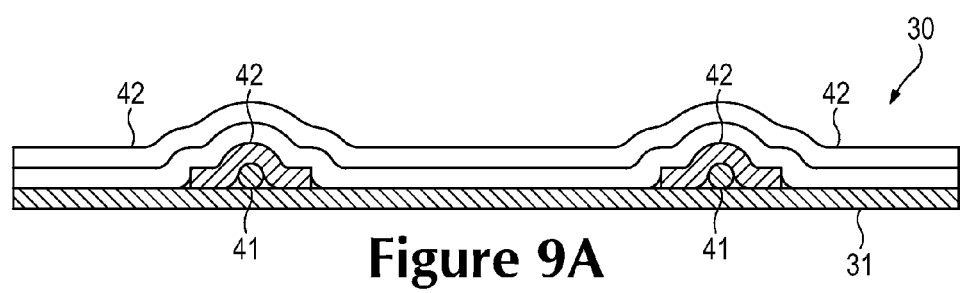
FIGS. 9A and 9B are cross-sectional views of the second portion of the upper, as defined by section lines 9A and 9B in FIG. 7.
Figure 9B:
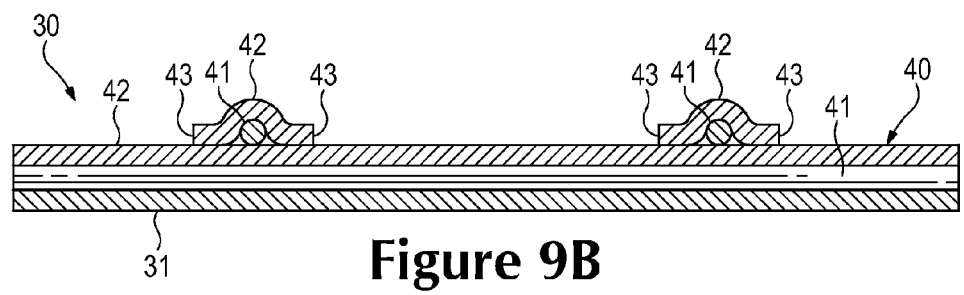

Each of cover layers 42 define two opposite edges 43 with a substantially constant spacing, and strands 41 may be centered between edges 43. Referring to FIGS. 3 and 6A, for example, the various cover layers 42 extend over strands 41 and form bulges or protruding areas in the centers of cover layers 42. That is, the centrally-located strands 41 form the protruding areas in the centers of cover layers 42. Given that cover layers 42 assist in securing strands 41 to foundation element 31 and also assist in protecting strands 41 from abrasion or wear, strands 41 are often centered relative to edges 43. In some configurations of footwear 10, however, strands 41 may be offset from the center of cover layers 42. In areas where strands 41 lie adjacent and substantially parallel to the exterior surface of foundation element 31 for a distance of five centimeters or more, edges 43 may retain the substantially constant spacing for the distance of five centimeters or more.

Although cover layers 42 may be continuous between edges 43 and along the lengths of strands 41, cover layers 42 may also exhibit various other configurations. For example, cover layers 42 may define various apertures or perforations that expose areas of foundation element 31 or strands 41. As another example, cover layers 42 may have gaps or other discontinuities along the lengths of strands 41. That is, a plurality of segments of cover layers 42 may extend over strands 41, with gaps being present between the segments.

Areas of the exterior surface of foundation element 31 are exposed beyond edges 43. As discussed above, a majority of the exterior surface of upper 30 is formed by the combination of foundation element 31 and tensile element 40. In some configurations of tensile element 40, cover layers 42 may be formed from polymer sheets, whereas foundation element 31 may be formed from a textile material. Given that polymer sheets are generally less permeable to air, humidity, and water than textiles, areas of upper 30 that include tensile element 40 may have less permeability than areas where foundation element 31 is exposed. Areas of upper 30 where areas of the exterior surface of foundation element 31 are exposed beyond edges 43, however, remain permeable to enhance the degree to which air, humid air, heated air, or perspiration may exit upper 30 when footwear 10 is worn.

A second portion of upper 30 including tensile element 40 is depicted in FIGS. 7-9B. In this area of upper 30, strands 41 and cover layers 42 extending in a first direction (e.g., longitudinally between forefoot region 11 and heel region 13) cross over strands 41 and cover layers 42 extending in a second direction (e.g., from lace apertures 34 to sole structure 20). In areas where portions of tensile element 40 cross each other, upper 30 has a layered configuration that includes at least a first layer formed from foundation element 31, a second layer formed form one of cover layers 42, and a third layer formed from another one of cover layers 42. Additionally, at least two strands 41 that also cross each other are located within the layered configuration.

Strands 41 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable materials for strands 41 include various filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, and steel. Whereas filaments have an indefinite length and may be utilized individually as strands 41, fibers have a relatively short length and generally go through spinning or twisting processes to produce a strand of suitable length. An individual filament utilized in strands 41 may be formed form a single material (i.e., a monocomponent filament) or from multiple materials (i.e., a bicomponent filament). Similarly, different filaments may be formed from different materials. As an example, yarns utilized as strands 41 may include filaments that are each formed from a common material, may include filaments that are each formed from two or more different materials, or may include filaments that are each formed from two or more different materials. Similar concepts also apply to threads, cables, or ropes. The thickness of strands 41 may also vary significantly to range from 0.03 millimeters to more than 5 millimeters, for example. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material.

Cover layers 42, as well as portions of foundation element 31, may be formed from any generally two-dimensional material. As utilized with respect to the present invention, the term "two-dimensional material" or variants thereof is intended to encompass generally flat materials exhibiting a length and a width that are substantially greater than a thickness. Accordingly, suitable materials for cover layers 42 include various textiles, polymer sheets, or combinations of textiles and polymer sheets, for example. Textiles are generally manufactured from fibers, filaments, or yarns that are, for example, either (a) produced directly from webs of fibers by bonding, fusing, or interlocking to construct non-woven fabrics and felts or (b) formed through a mechanical manipulation of yarn to produce a woven or knitted fabric. The textiles may incorporate fibers that are arranged to impart one-directional stretch or multi-directional stretch, and the textiles may include coatings that form a breathable and water-resistant barrier, for example. The polymer sheets may be extruded, rolled, or otherwise formed from a polymer material to exhibit a generally flat aspect. Two-dimensional materials may also encompass laminated or otherwise layered materials that include two or more layers of textiles, polymer sheets, or combinations of textiles and polymer sheets. In addition to textiles and polymer sheets, other two-dimensional materials may be utilized for cover layers 42. Although two-dimensional materials may have smooth or generally untextured surfaces, some two-dimensional materials will exhibit textures or other surface characteristics, such as dimpling, protrusions, ribs, or various patterns, for example. Despite the presence of surface characteristics, two-dimensional materials remain generally flat and exhibit a length and a width that are substantially greater than a thickness. In some configurations, mesh materials or perforated materials may be utilized for cover layers 42 to impart greater permeability.

Although cover layers 42 may be formed from a variety of materials, incorporating a thermoplastic polymer material (e.g., thermoplastic polyurethane) into cover layers 42 may facilitate bonding between cover layers 42 and foundation element 31, as well as securing strands 41 between cover layers 42 and foundation element 31. As examples, cover layers 42 may be (a) a thermoplastic polymer sheet, (b) a textile that includes filaments or fibers formed from a thermoplastic polymer material, or (c) a combination of a textile and a thermoplastic polymer sheet. In any of these configurations, heating the thermoplastic polymer material of cover layers 42 may form a bond with both strands 41 and foundation element 31. In other configurations, foundation element 31 may incorporate the thermoplastic polymer material. As an additional matter, cover layers 42 may be formed from an at least partially transparent polymer material that provides visibility of strands 41 to enhance the aesthetic properties of footwear 10.

Based upon the above discussion, tensile element 40 generally includes strands 41 and cover layers 42, with strands 41 being located between the exterior surface of foundation element 31 and cover layers 42. Although strands 41 may pass through one of foundation element 31 and cover layers 42, strands 41 generally lie adjacent to and parallel to surfaces of foundation element 31 and cover layers 42 for more than twelve millimeters and even more than five centimeters. Whereas a variety of one dimensional materials may be used for strands 41, one or more two dimensional materials may be used for foundation element 31 and cover layers 42. Moreover, when cover layers 42, for example, include a thermoplastic polymer material, heating of the thermoplastic polymer material may cause bonding between cover layers 42 and other elements of upper 30.

Structural Components

A conventional upper may be formed from multiple material layers that each impart different properties to various areas of the upper. During use, an upper may experience significant tensile forces, and one or more layers of material are positioned in areas of the upper to resist the tensile forces. That is, individual layers may be incorporated into specific portions of the upper to resist tensile forces that arise during use of the footwear. As an example, a woven textile may be incorporated into an upper to impart stretch resistance in the longitudinal direction. A woven textile is formed from yarns that interweave at right angles to each other. If the woven textile is incorporated into the upper for purposes of longitudinal stretch-resistance, then only the yarns oriented in the longitudinal direction will contribute to longitudinal stretch-resistance, and the yarns oriented orthogonal to the longitudinal direction will not generally contribute to longitudinal stretch-resistance. Approximately one-half of the yarns in the woven textile are, therefore, superfluous to longitudinal stretch-resistance. As an extension of this example, the degree of stretch-resistance required in different areas of the upper may vary. Whereas some areas of the upper may require a relatively high degree of stretch-resistance, other areas of the upper may require a relatively low degree of stretch-resistance. Because the woven textile may be utilized in areas requiring both high and low degrees of stretch-resistance, some of the yarns in the woven textile are superfluous in areas requiring the low degree of stretch-resistance. In this example, the superfluous yarns add to the overall mass of the footwear, without adding beneficial properties to the footwear. Similar concepts apply to other materials, such as leather and polymer sheets, that are utilized for one or more of wear-resistance, flexibility, air-permeability, cushioning, and moisture-wicking, for example.

As a summary of the above discussion, materials utilized in the conventional upper formed from multiple layers of material may have superfluous portions that do not significantly contribute to the desired properties of the upper. With regard to stretch-resistance, for example, a layer may have material that imparts (a) a greater number of directions of stretch-resistance or (b) a greater degree of stretch-resistance than is necessary or desired. The superfluous portions of these materials may, therefore, add to the overall mass and cost of the footwear, without contributing significant beneficial properties.

In contrast with the conventional layered construction discussed above, upper 30 is constructed to minimize the presence of superfluous material. Foundation element 31 provides a covering for the foot, but may exhibit a relatively low mass. Tensile element 40, which includes the various strands 41, is positioned to provide stretch-resistance in particular directions and locations, and the number of strands 41 is selected to impart the desired degree of stretch-resistance. Accordingly, the orientations, locations, and quantity of strands 41 are selected to provide structural components that are tailored to a specific purpose.

For purposes of reference in the following discussion, four strand groups 51-54 are identified in FIGS. 1 and 2. Strand group 51 includes the various strands 41 extending downward from the lace aperture 34 closest to ankle opening 31. Similarly, strand groups 52 and 53 include the various strands 41 extending downward from other lace apertures 34. Additionally, strand group 54 includes the various strands 41 that extend between forefoot region 11 and heel region 13.

The various strands 41 that extend between lace apertures 34 and 44 and sole structure 20 resist stretch in the medial-lateral direction, which may be due to tension in lace 33. More particularly, the various strands 41 in strand group 51 cooperatively resist stretch from the portion of lace 32 that extends through the lace aperture 44 closest to ankle opening 31. Strand group 51 also radiates outward when extending away from lace aperture 44, thereby distributing the forces from lace 33 over an area of upper 30. Similar concepts also apply to strand groups 52 and 53. The various strands 41 that extend between forefoot region 11 and heel region 13 resist stretch in the longitudinal direction. More particularly, the various strands 41 in strand group 54 cooperatively resist stretch in the longitudinal direction, and the number of strands 41 in strand group 54 are selected to provide a specific degree of stretch-resistance through regions 11-13. Additionally, strands 41 in strand group 54 also cross over each of the strands 41 in strand groups 51-53 to impart a relatively continuous stretch resistance through regions 11-13.

Depending upon the specific configuration of footwear 10 and the intended use of footwear 10, foundation element 31 and cover layers 42 may be non-stretch materials, materials with one-directional stretch, or materials with two-directional stretch, for example. In general, forming foundation element 31 and cover layers 42 from materials with two-directional stretch provides upper 30 with a greater ability to conform with the contours of the foot, thereby enhancing the comfort of footwear 10. In configurations where foundation element 31 and cover layers 42 have two-directional stretch, the combination of strands 41 with foundation element 31 and cover layers 42 effectively varies the stretch characteristics of upper 30 in specific locations. With regard to upper 30, the combination of strands 41 with foundation element 31 and cover layers 42 having two-directional stretch forms zones in upper 30 that have different stretch characteristics, and the zones include (a) first zones where no strands 41 are present and upper 30 exhibits two-directional stretch, (b) second zones where strands 41 are present and do not cross each other, and upper 30 exhibits one-directional stretch in a direction that is orthogonal (i.e., perpendicular) to strands 41, and (c) third zones where strands 41 are present and cross each other, and upper 30 exhibits substantially no stretch or limited stretch. Accordingly, the overall stretch characteristics of particular areas of upper 30 may be controlled by presence of strands 41 and whether strands 41 cross each other.

Based upon the above discussion, strands 41 may be utilized to form structural components in upper 30. In general, strands 41 resist stretch to limit the overall stretch in upper 30. Strands 41 may also be utilized to distribute forces (e.g., forces from lace 33) to different areas of upper 30. Accordingly, the orientations, locations, and quantity of strands 41 are selected to provide structural components that are tailored to a specific purpose. Moreover, the orientations of strands 41 relative to each other and whether strands 41 cross each other may be utilized to control the directions of stretch in different portions of upper 30.

Manufacturing Process

A variety of methods may be utilized to manufacture upper 30, including tensile element 40. As an example, an embroidery process may be utilized to locate strands 41 relative to foundation element 31. Once strands 41 are positioned, cover layers 42 may be bonded to foundation element 31 and strands 41, thereby securing strands 41 within tensile element 40. A similar process is described in detail in U.S. patent application Ser. No. 11/442,679, which was filed in the U.S. Patent and Trademark Office on 25 May 2006 and entitled Article Of Footwear Having An Upper With Thread Structural Elements, such prior application being entirely incorporated herein by reference. As an alternative to an embroidery process, other stitching processes may be utilized to locate strands 41 relative to foundation element 31, such as computer stitching. Additionally, processes that involve winding strands 41 around pegs on a frame around foundation element 31 may be utilized to locate strands 41.

Figure 10A:
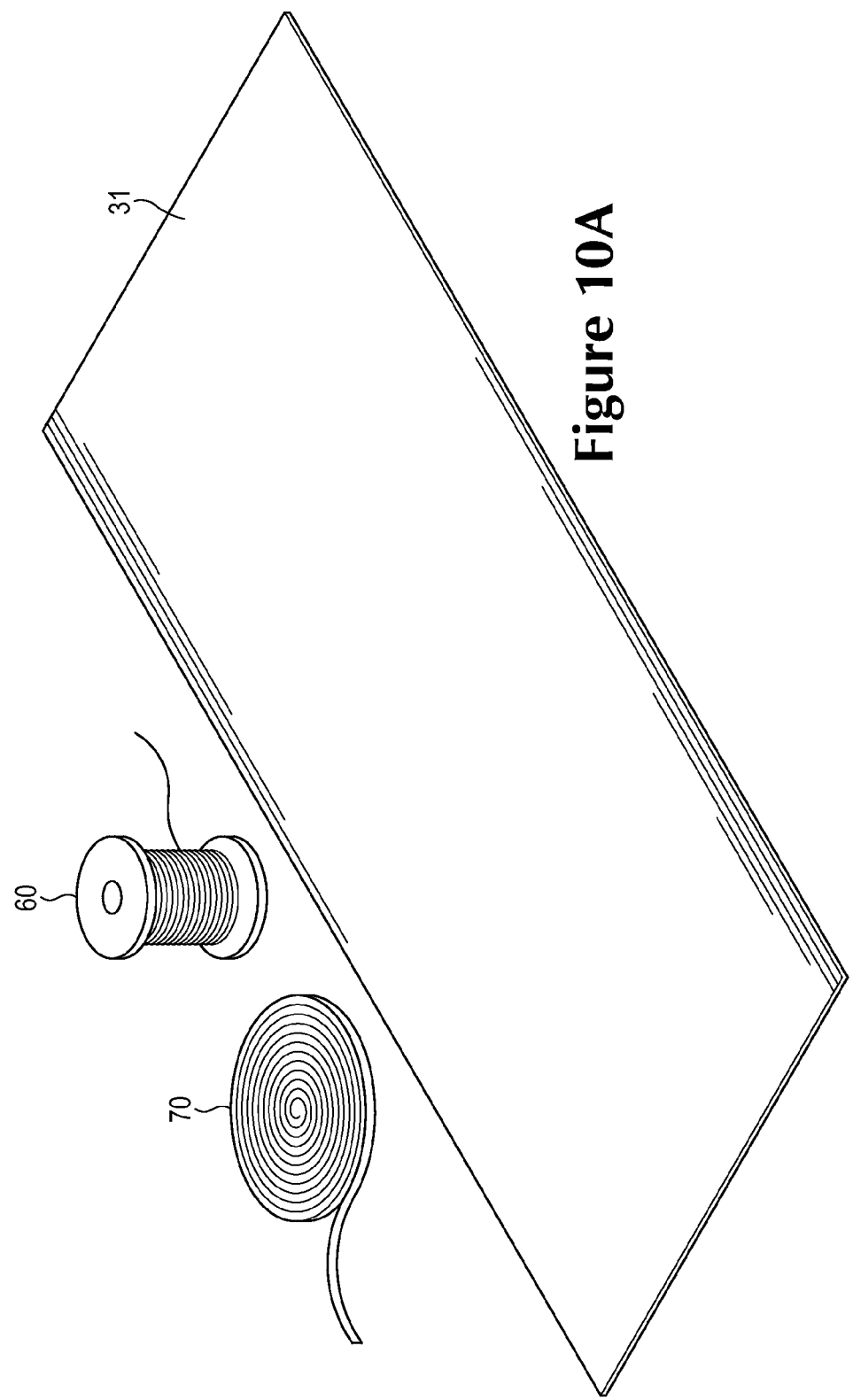
Figure 10B:
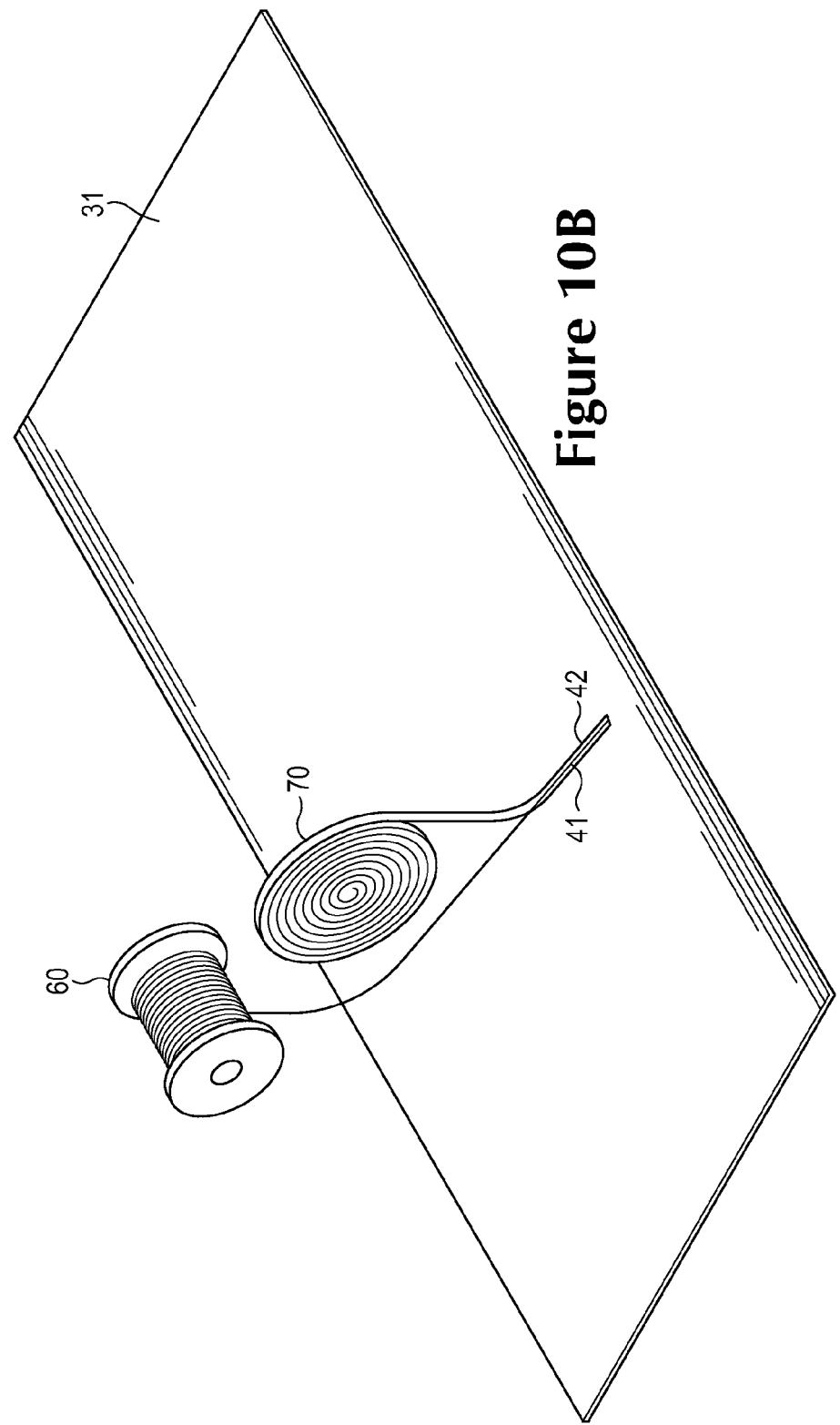
Figure 10D:
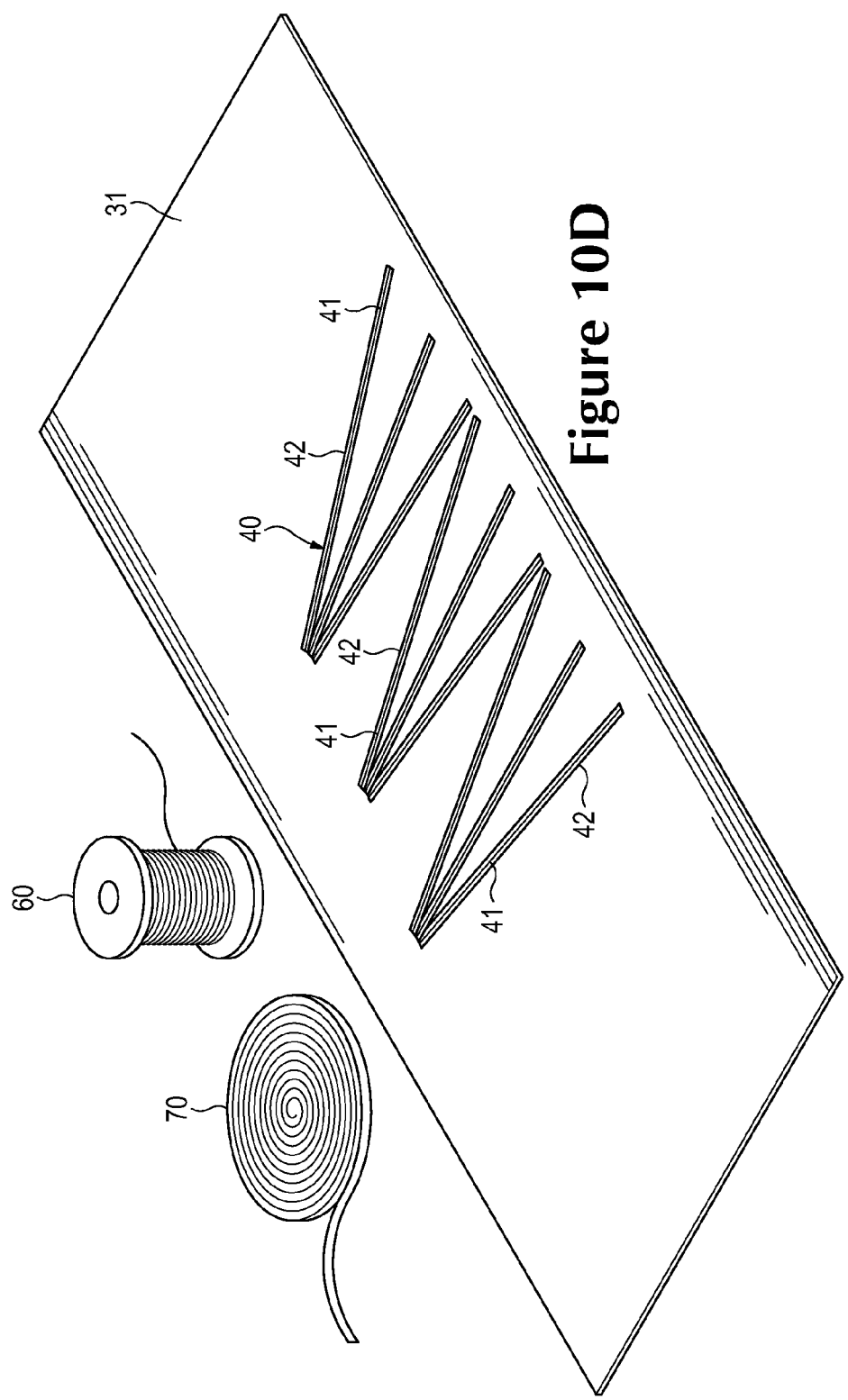

Another process that may be utilized to form tensile element 40 and secure tensile element 40 to foundation element 31 will now be discussed. With reference to FIG. 10A, a generally rectangular sheet of material that may be utilized to form a portion of foundation element 31 (e.g., the portion forming lateral side 14) is depicted in connection with (a) a spool 60 of the one-dimensional material that forms strands 41 and (b) a roll 70 of the two-dimensional material that forms cover layer 42. A section of strand 41 from spool 60 and a section of cover layer 42 from roll 70 are then laid against and bonded (e.g., with heat) with foundation element 31 to begin forming a portion of tensile element 40 that extends from one of lace apertures 34 to sole structure 20, as depicted in FIG. 10B. More particularly, the section of strand 41 is laid against foundation element 31 and the section of cover layer 42 is laid over strand 41 and bonded to foundation element 31. In some manufacturing methods, a seam taping machine or a seam sealing tape machine may be modified to simultaneously lay strands 41 and cover layers 42 against foundation element 31 and also bond cover layers 42 to foundation element 31. When a seam taping machine is utilized, conventional seam tape materials (e.g., thermoplastic polyurethane) may be utilized as cover layers 42. Additional sections of strands 41 from spool 60 and cover layers 42 from roll 70 are then laid against and bonded with foundation element 31 to form other portions of tensile element 40 that extend from one of lace apertures 34 to sole structure 20, as depicted in FIGS. 10C and 10D. An advantage of simultaneously laying a strand 41 and a cover layer 42 that extends over the strand 41 is that the position of the strand 41 is secured by the bonding between cover layer 42 and foundation element 31.

Figure 10F:
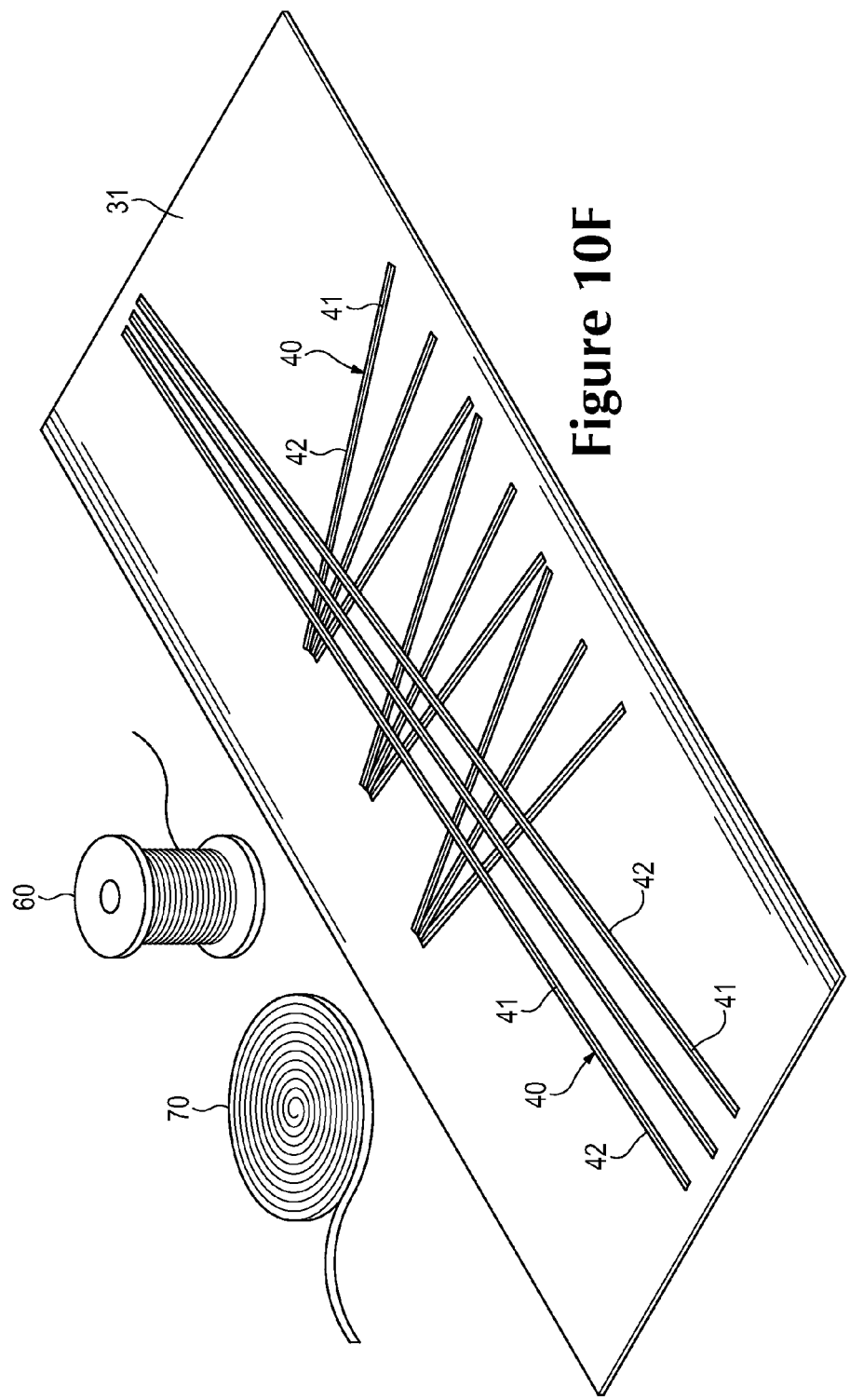

A similar procedure is then utilized to form each of the portions of tensile element 40 that extend between forefoot region 11 and heel region 13, as depicted in FIGS. 10E and 10F. More particularly, sections of strands 41 are laid against foundation element 31 and the sections of cover layers 42 are laid over strands 41 and bonded to foundation element 31. Once tensile element 40 is laid against foundation element 31 and bonded with foundation element 31, the combination of foundation element 31 and tensile element 40 may be cut (i.e., with scissors, die cutting, or laser cutting) to a shape that is suitable for forming lateral side 14 of upper 30, and the various lace apertures 34 may be formed, as depicted in FIG. 10G. This element may then be joined with a substantially similar element to form a majority of upper 30, and sole structure 20 may be bonded to upper 30 to substantially complete the manufacture of footwear 10. In some manufacturing processes, both lateral side 14 and medial side 15 may be formed from a single section of the material that forms foundation element 31.

In the procedure discussed above and depicted in FIGS. 10A-10G, ends of the various sections of material forming strands 41 and cover layers 42 extend beyond the boundaries of the shape that is suitable for forming lateral side 14 of upper 30, and these ends are cut. In this configuration, the ends of strands 41 and cover layers 42 extend to the edges of foundation element 31. An advantage of this process is that strands 41 extend across substantially all of the width and height of foundation element 31 to form structural components in upper 30 that resist stretch.

Further Configurations

Figure 11A:
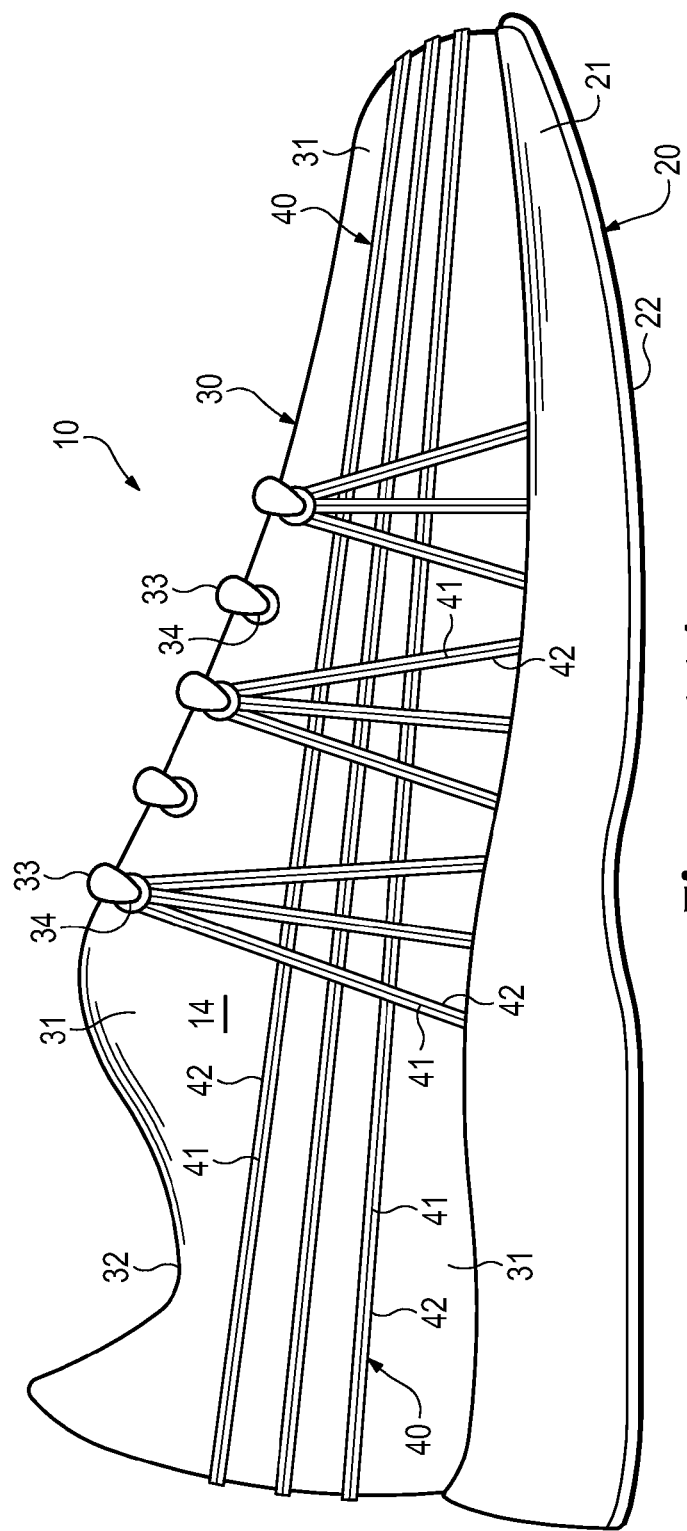
FIGS. 11A-11D are lateral side elevational views corresponding with FIG. 1 and depicting further configurations of the article of footwear.
Figure 11B:
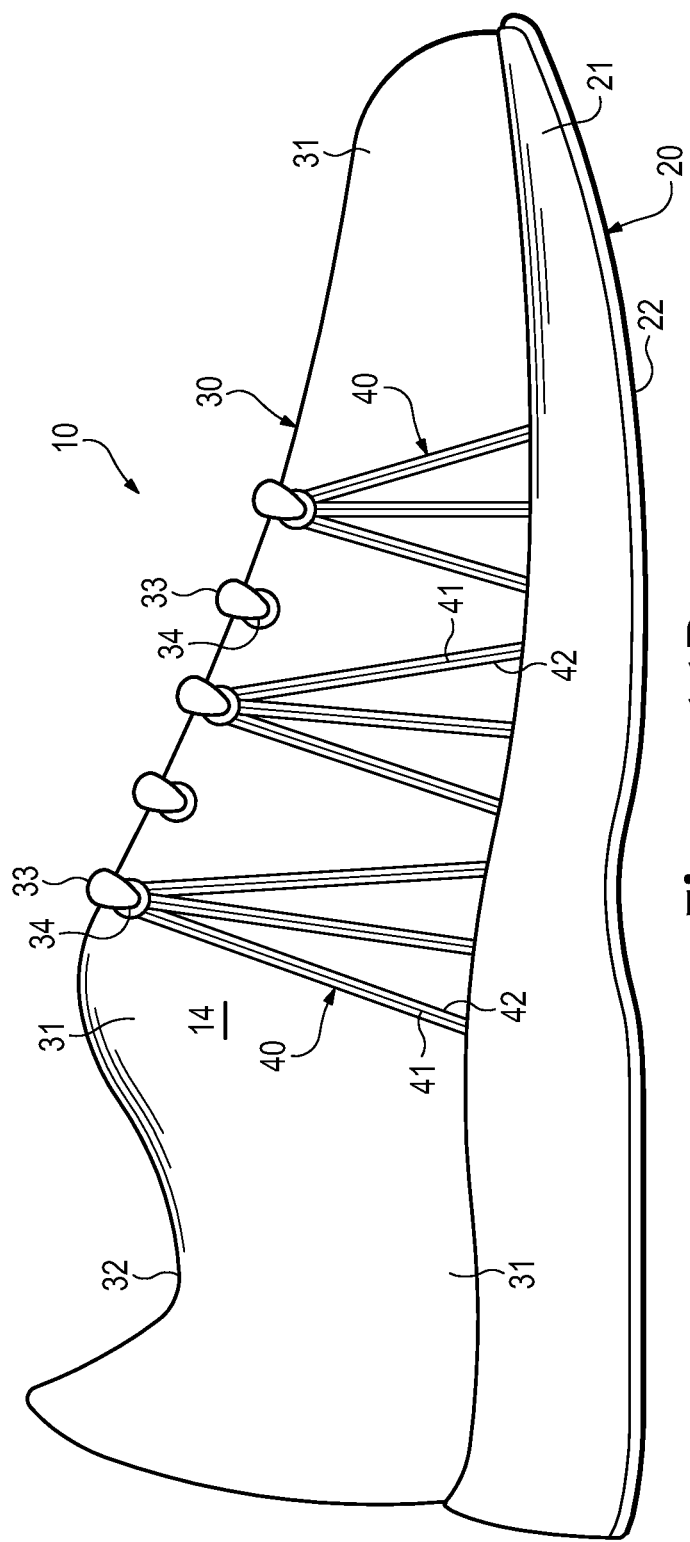
Figure 11C:
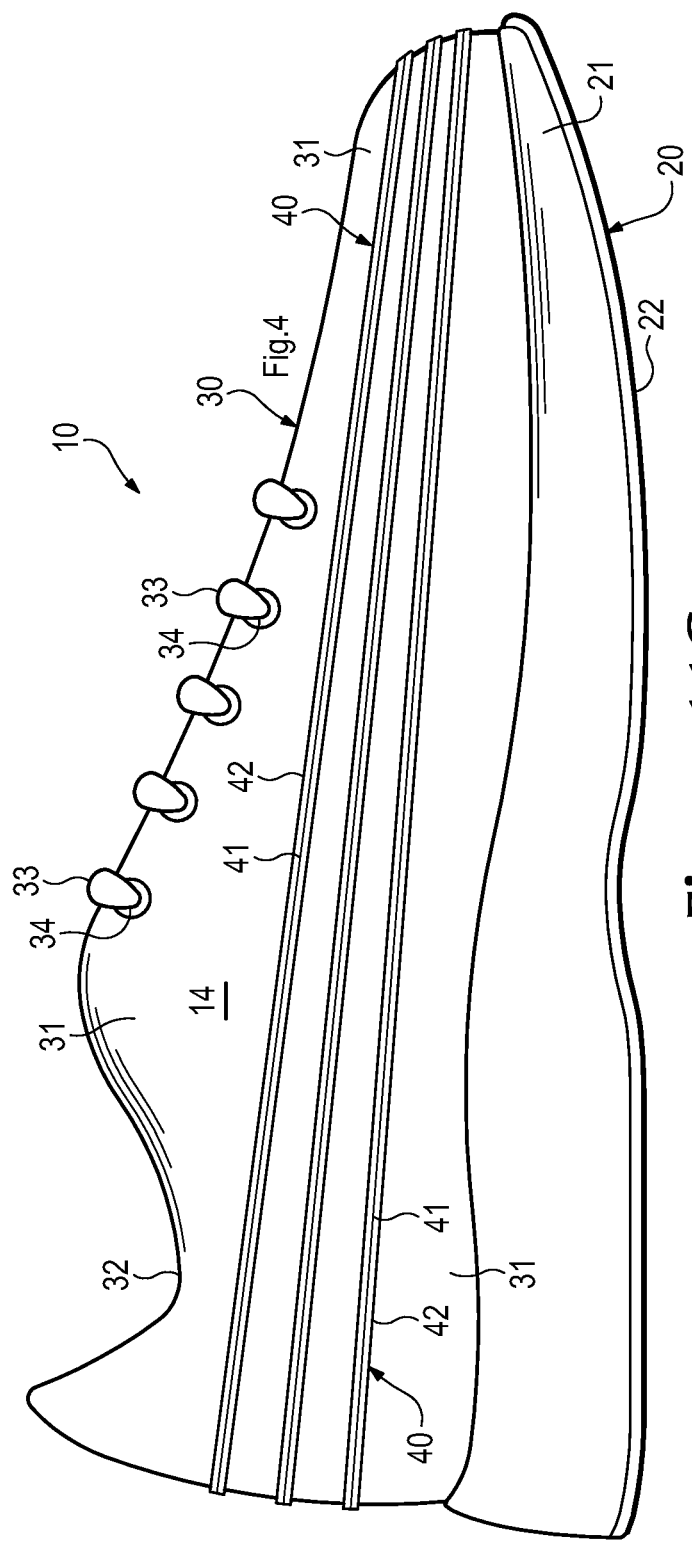
Figure 11D:
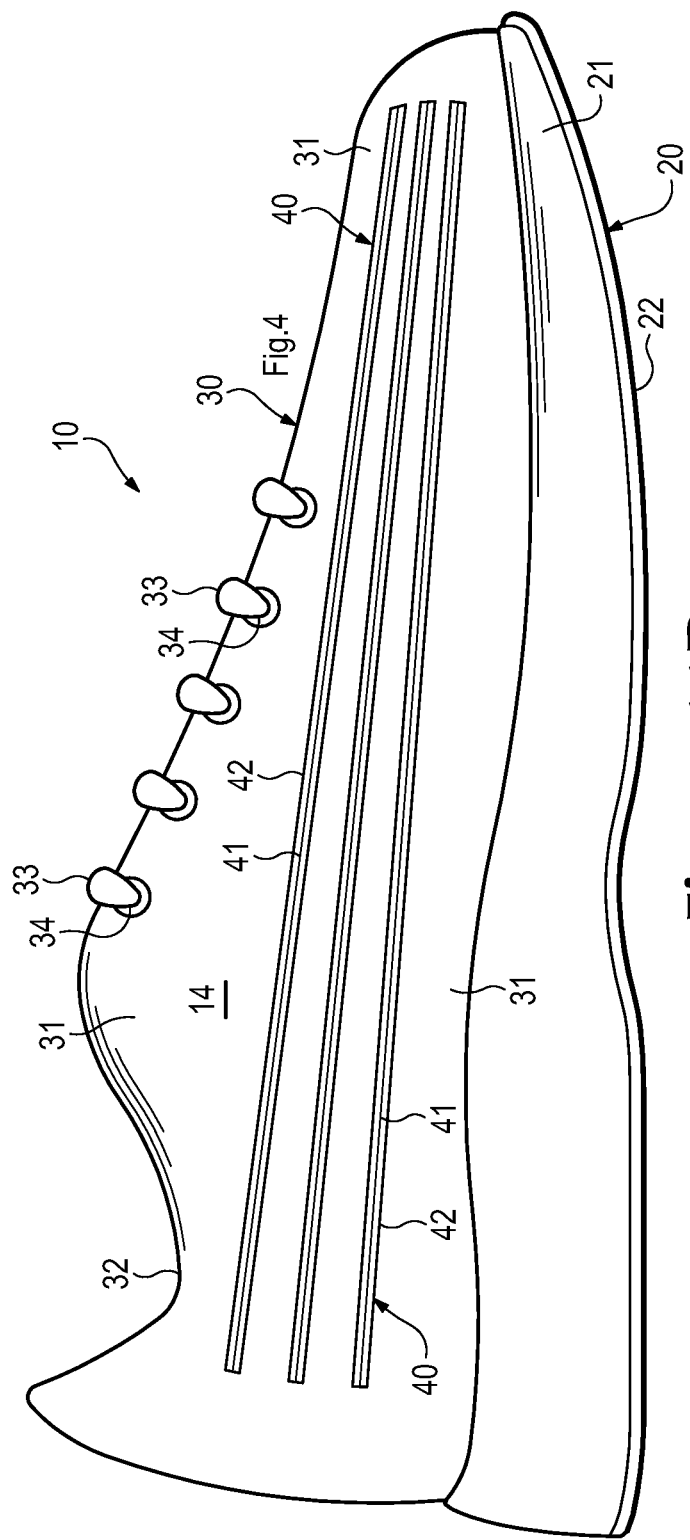

The orientations, locations, and quantity of strands 41 in FIGS. 1 and 2 are intended to provide an example of a suitable configuration for footwear 10. In other configurations of footwear 10, various aspects of tensile element 40 and footwear 10 may vary considerably. Referring to FIG. 11A, another configuration is depicted, wherein the strands 41 and cover layers 42 extending from lace apertures 34 to sole structure 20 cross over the strands 41 and cover layers 42 extending from forefoot region 11 to heel region 13. In similar configurations, these areas may cross over and under other strands 41 and cover layers 42 to impart a woven appearance to upper 30. In further configurations, strands 41 and cover layers 42 may extend only from lace apertures 34 to sole structure 20 or only from forefoot region 11 to heel region 13, as respectively depicted in FIGS. 11B and 11C. Although strands 41 and cover layers 42 may extend entirely through the longitudinal length or height of upper 30, strands 41 and cover layers 42 may also only extend through a portion of these distances. For example, FIG. 11D depicts a configuration wherein strands 41 and cover layers 42 extend through a portion of the longitudinal length.

Figure 12A:
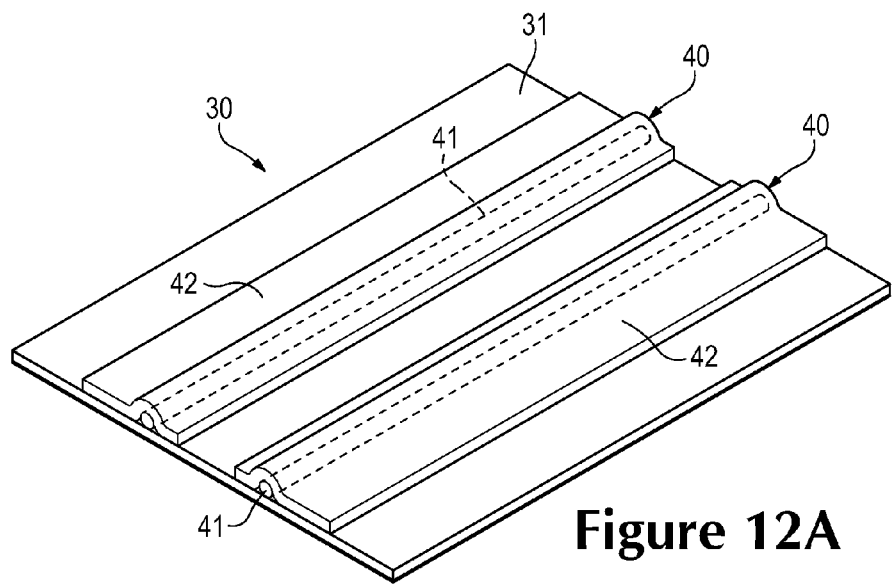
FIGS. 12A-12E are perspective views of a portion of the upper and depicting further configurations of the article of footwear.
Figure 12B:
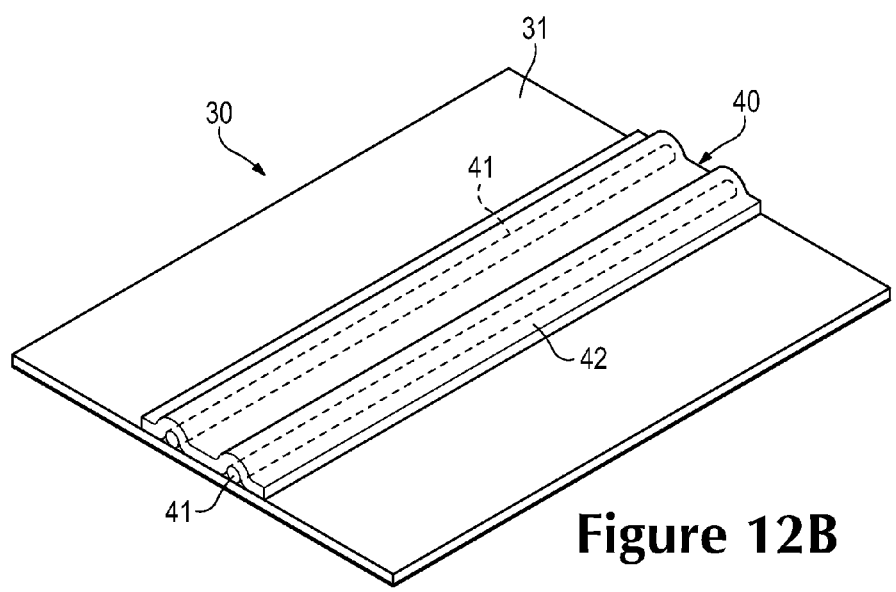
Figure 12C:
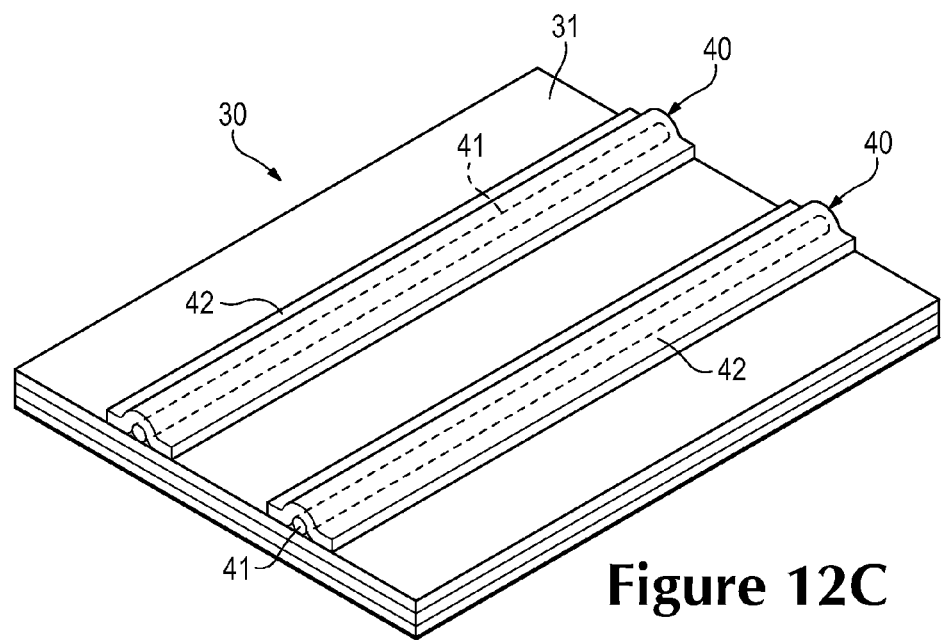
Figure 12D:
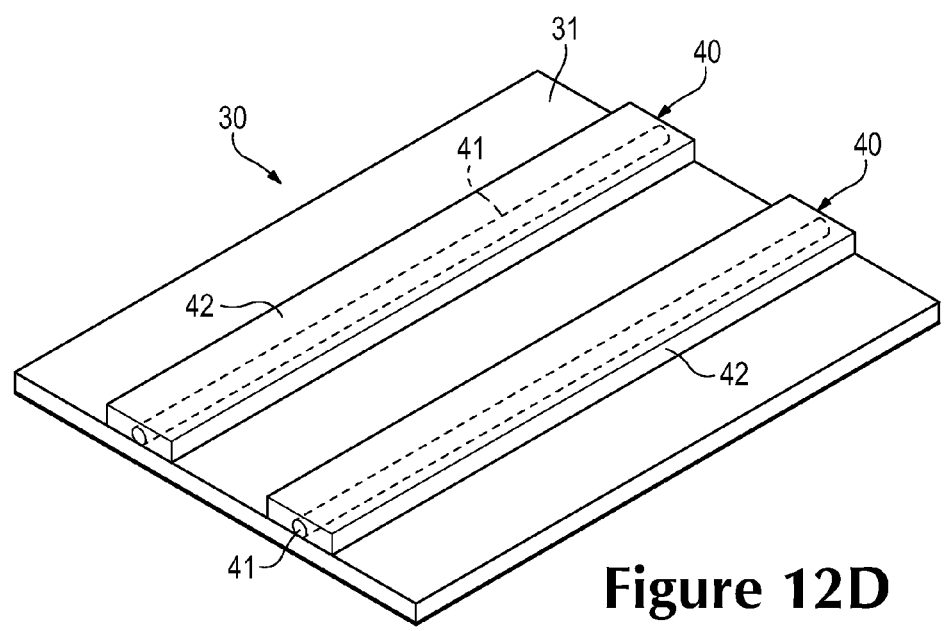
Figure 12E:
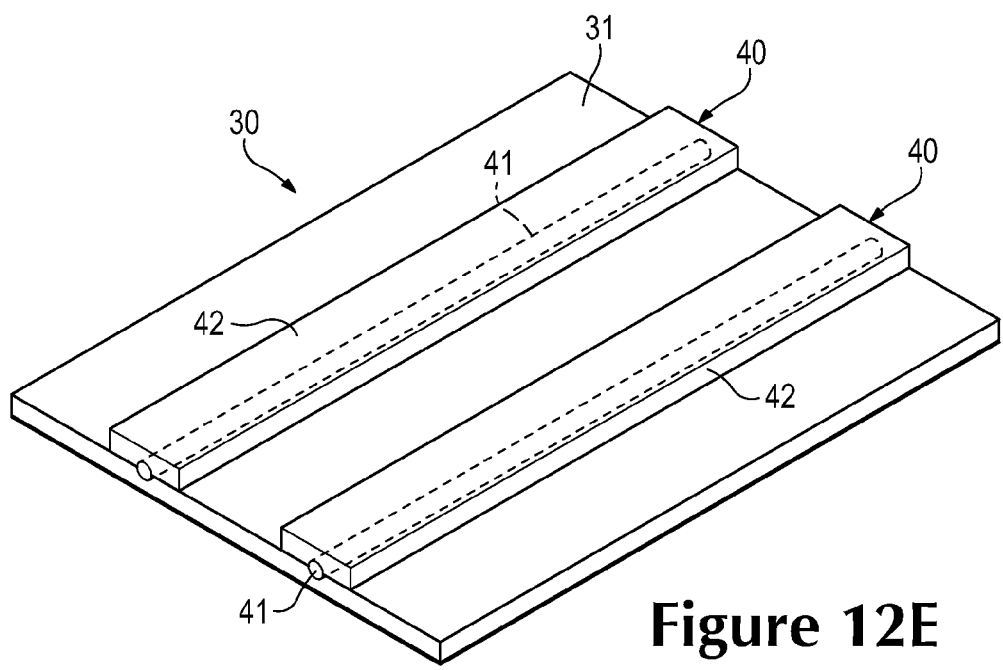

Although strands 41 may be centered relative to edges 43 of cover layers 42, FIG. 12A depicts a configuration wherein strands 41 are offset from centers of cover layers 42. In further configurations, multiple strands 41 may be associated with a single cover layer 42, as depicted in FIG. 12B. Foundation element 31 is depicted in FIG. 3 as being formed from a single layer of material. Referring to FIG. 12C, however, foundation element 31 includes three layers. As examples, the inner and outer layers may be textiles, whereas the central layer may be a comfort-enhancing polymer foam material. In many configurations depicted in prior figures, cover layers 42 protrude outward in the areas of strands 41, but strands 41 may be embedded within cover layers 42, as depicted in FIG. 12D. Similarly, strands 41 may also be partially (or wholly) embedded within foundation element 31, as depicted in FIG. 12E. In each of these configurations, strands 41 lie adjacent to the exterior surface of foundation element 31 and substantially parallel to the exterior surface of foundation element 31.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing an article of footwear, the method comprising:
   securing a plurality of separated sections of strand along an exterior surface of an upper of the article of footwear;
   wherein the step of securing the plurality of separated sections of strand further includes the steps of:
   simultaneously laying each separated section of strand and an associated separated section of cover layer against the exterior surface of the upper of the article of footwear, each of the plurality of separated sections of strand having the configuration of a one-dimensional material, and each separated section of strand being positioned between the associated separated section of cover layer and the exterior surface, and each separated section of strand being substantially parallel to the exterior surface for a distance of at least five centimeters; and
   bonding each associated separated section of cover layer to the exterior surface to secure each separated section of strand to the upper.

2. The method recited in claim 1, further including a step of selecting the cover layer to include a thermoplastic polymer material.

3. The method recited in claim 2, wherein the step of bonding includes heating the thermoplastic polymer material to join the cover layer to the exterior surface.

4. The method recited in claim 1, wherein the step of simultaneously laying includes centering the each separated section of strand between edges of the associated separated section of cover layer.

5. The method recited in claim 1, wherein the step of simultaneously laying includes leaving exposed areas of the exterior surface beyond the edges of the separated sections of cover layer.

6. The method recited in claim 1, wherein the step of simultaneously laying includes orienting the each separated section of strand and the associated separated section of cover layer to extend between either (a) a lace area of the upper and an area where a sole structure joins to the upper or (b) a heel region and a forefoot region of the upper.

7. A method of manufacturing an upper for an article of footwear, the method comprising:
   providing a foundation element having an interior surface and an opposite exterior surface, the foundation element forming at least a portion of the upper of the article of footwear;
   locating at least two strands against the exterior surface of the foundation element, the at least two strands having a configuration of a one-dimensional material and being substantially parallel to the exterior surface for a distance of at least five centimeters;
   locating an associated cover layer against each strand of the at least two strands and the exterior surface of the foundation element, each strand of the at least two strands being positioned between an inner surface of each associated cover layer and the exterior surface of the foundation element, each cover layer having a pair of edges on opposite sides of each strand of the at least two strands, the strand being substantially centered between the pair of edges of the associated cover layer for the distance of at least five centimeters, and areas of the exterior surface of the foundation element being exposed beyond the pair of edges of the associated cover layer; and
   bonding each associated cover layer to the exterior surface to secure the position of each of the at least two strands on the upper.

8. The method recited in claim 7, further comprising simultaneously locating each strand of the at least two strands and the associated cover layer against the exterior surface of the foundation element.

9. The method recited in claim 8, further comprising using a seam taping machine to perform the step of simultaneously locating each strand of the at least two strands and the associated cover layer against the exterior surface of the foundation element.

10. The method recited in claim 7, further including a step of cutting out a portion of the foundation element including the at least two strands and the associated cover layers in a shape associated with the upper of the article of footwear.

11. The method recited in claim 10, further comprising joining the cut-out portion of the foundation element with a substantially similar portion of another foundation element to form the upper of the article of footwear.

12. The method recited in claim 7, wherein the step of bonding each cover layer to the exterior surface includes directly bonding the pair of edges of each cover layer to the exterior surface of the foundation element to secure each strand of the at least two strands between the inner surface of each associated cover layer and the exterior surface of the foundation element.

13. The method recited in claim 7, wherein the step of locating the at least two strands and the step of locating the associated covers layer includes orienting each strand of the at least two strands and each associated cover layer to extend between either (a) a lace area of the upper and an area where a sole structure joins to the upper or (b) a heel region and a forefoot region of the upper.

14. The method recited in claim 7, wherein the foundation element has a layered structure, at least a first layer of the layer structure forming the interior surface, and at least a second layer of the layered structure forming the exterior surface; and wherein each cover layer is bonded to the second layer.

15. The method recited in claim 7, the method further comprising:

locating another strand and another cover layer to cross over at least one of the at least two strands and the associated cover layer such that the at least one strand and the associated cover layer are positioned between (a) the foundation element and (b) each of the another strand and the another cover layer.

16. A method of manufacturing an upper for an article of footwear, the method comprising:

providing a foundation element having an interior surface and an opposite exterior surface, the foundation element forming at least a portion of the upper of the article of footwear;

locating a first strand adjacent to the exterior surface of the foundation element, the first strand being substantially parallel to the exterior surface for a first distance of at least five centimeters;

locating a first cover layer against the first strand and the exterior surface of the foundation element, the first cover layer extending along and secured to the first strand for the first distance of at least five centimeters, the first strand being positioned between an inner surface of the first cover layer and the exterior surface of the foundation element;

locating a second strand adjacent to the exterior surface of the foundation element, the second strand being substantially parallel to the exterior surface for a second distance of at least five centimeters, the second strand crossing over the first strand such that the first strand is positioned between the exterior surface of the foundation element and the second strand;

locating a second cover layer against the second strand and at least a portion of the exterior surface of the foundation element, the second cover layer extending along and secured to the second strand for the second distance of at least five centimeters, the second strand being positioned between an inner surface of the second cover layer and at least a portion of the exterior surface of the foundation element;

bonding the first cover layer and the second cover layer to the exterior surface.

17. The method recited in claim 16, wherein the step of locating the second strand includes positioning the second strand between an outer surface of the first cover layer and the inner surface of the second cover layer where the second strand crosses over the first strand.

18. The method recited in claim 16, further comprising joining the upper including the foundation element, the first strand, the first cover layer, the second strand, and the second cover layer with a sole structure to form the article of footwear.

19. The method recited in claim 18, wherein the step of locating the first strand and the step of locating the first cover layer includes extending the first strand and the first cover layer between a lace area of the upper and an area where the sole structure of the article of footwear is joined to the upper.

20. The method recited in claim 18, wherein the step of locating the second strand and the step of locating the second cover layer includes extending the second strand and the second cover layer between a heel region and a forefoot region of the upper.

* * * * *